United States Patent
Kim et al.

(10) Patent No.: US 11,658,393 B2
(45) Date of Patent: May 23, 2023

(54) ELECTRONIC DEVICE WITH RADIO-FREQUENCY MODULE

(71) Applicant: Samsung Electro-Mechanics Co., Ltd., Suwon-si (KR)

(72) Inventors: Hak Gu Kim, Suwon-si (KR); Young Sik Hur, Suwon-si (KR); Yoo Sam Na, Suwon-si (KR); Won Gi Kim, Suwon-si (KR); Young Bal Kim, Suwon-si (KR); Soo Ki Choi, Suwon-si (KR); Ho Kyung Kang, Suwon-si (KR); Young Kyoon Im, Suwon-si (KR); Seong Jong Cheon, Suwon-si (KR)

(73) Assignee: Samsung Electro-Mechanics Co., Ltd., Suwon-si (KR)

( * ) Notice: Subject to any disclaimer, the term of this patent is extended or adjusted under 35 U.S.C. 154(b) by 23 days.

(21) Appl. No.: 17/354,425

(22) Filed: Jun. 22, 2021

(65) Prior Publication Data
US 2021/0313672 A1 Oct. 7, 2021

Related U.S. Application Data

(63) Continuation of application No. 16/937,981, filed on Jul. 24, 2020, now Pat. No. 11,335,991.

(30) Foreign Application Priority Data

Nov. 13, 2019 (KR) .......................... 10-2019-0145360
Feb. 21, 2020 (KR) .......................... 10-2020-0021584

(51) Int. Cl.
*H01Q 1/22* (2006.01)
*H01Q 1/08* (2006.01)
(Continued)

(52) U.S. Cl.
CPC .......... *H01Q 1/2283* (2013.01); *H01Q 1/085* (2013.01); *H01Q 21/28* (2013.01); *H04B 1/04* (2013.01); *H04B 1/16* (2013.01)

(58) Field of Classification Search
CPC ...... H01Q 9/04; H01Q 9/0407; H01Q 9/0414; H01Q 5/35; H01Q 1/085; H01Q 1/2283; H01Q 1/28; H01Q 1/38; H01Q 23/00
See application file for complete search history.

(56) References Cited

U.S. PATENT DOCUMENTS 10,325,841 B2 * 6/2019 Nakagawa .............. H01L 24/06
11,335,991 B2 * 5/2022 Kim ...................... H01Q 23/00
(Continued)

FOREIGN PATENT DOCUMENTS

JP 2017-022398 A 1/2017
KR 10-2036546 B1 10/2019

*Primary Examiner* — Jason Crawford
(74) *Attorney, Agent, or Firm* — NSIP Law

(57) ABSTRACT

A radio-frequency device includes a radio-frequency module. The radio-frequency module includes a first substrate, a second substrate, a radio-frequency integrated circuit (RFIC), a front-end integrated circuit (FEIC), and a flexible substrate. The RFIC has at least a portion surrounded by a first core member and is configured to input or output a base signal and a first radio-frequency (RF) signal having a frequency higher than a frequency of the base signal. The FEIC has at least a portion surrounded by a second core member and is configured to input or output the first RF signal and a second RF signal having a power different from a power of the first RF signal. The flexible substrate is configured to connect the first and second substrates to each other, provide a transmission path for the first RF signal, and being more flexible than the first and second substrates.

21 Claims, 29 Drawing Sheets

(51) Int. Cl.
    *H01Q 21/28*     (2006.01)
    *H04B 1/16*     (2006.01)
    *H04B 1/04*     (2006.01)

(56) References Cited

U.S. PATENT DOCUMENTS

| | | | |
|---|---|---|---|
| 2010/0240327 A1* | 9/2010 | Lambrecht | H01Q 1/243 |
| | | | 343/702 |
| 2015/0071470 A1 | 3/2015 | Link et al. | |
| 2018/0062263 A1* | 3/2018 | Ueda | H01Q 21/06 |
| 2018/0254555 A1* | 9/2018 | Sotoma | H01Q 25/00 |
| 2019/0207323 A1* | 7/2019 | Joung | H01Q 25/005 |
| 2020/0112081 A1* | 4/2020 | Kim | H05K 1/148 |
| 2020/0127361 A1* | 4/2020 | Lee | H05K 1/0243 |
| 2020/0153086 A1* | 5/2020 | Park | H01Q 5/307 |
| 2020/0373646 A1* | 11/2020 | Murata | H01Q 21/0075 |
| 2020/0373655 A1* | 11/2020 | Takayama | H01Q 1/40 |
| 2020/0395675 A1* | 12/2020 | Han | H01Q 21/20 |
| 2021/0143525 A1* | 5/2021 | Kim | H01Q 1/38 |
| 2021/0235576 A1* | 7/2021 | Nagai | H05K 1/0237 |
| 2021/0242594 A1* | 8/2021 | Kang | H01Q 9/0407 |
| 2021/0242595 A1* | 8/2021 | Kim | H01Q 1/2283 |
| 2021/0242896 A1* | 8/2021 | Kim | H01L 23/552 |
| 2021/0257736 A1* | 8/2021 | Heo | H01Q 1/2283 |
| 2021/0313672 A1* | 10/2021 | Kim | H01Q 1/2283 |
| 2022/0224018 A1* | 7/2022 | Han | H01Q 21/20 |

* cited by examiner

ELECTRONIC DEVICE WITH RADIO-FREQUENCY MODULE

CROSS-REFERENCE TO RELATED APPLICATION(S)

This application is a continuation of U.S. patent application Ser. No. 16/937,981 filed on Jul. 24, 2020, which claims the benefit under 35 USC 119(a) of Korean Patent Application Nos. 10-2019-0145360 filed on Nov. 13, 2019, and 10-2020-0021584 filed on Feb. 21, 2020, in the Korean Intellectual Property Office, the entire disclosures of which are incorporated herein by reference for all purposes.

BACKGROUND

1. Field

This application relates to a radio-frequency module and an electronic device, including the same.

2. Description of Related Art

Data traffic for mobile communications is increasing rapidly every year. Technological development is underway to support the data transmission of such rapidly increased data traffic in real-time in wireless networks. For example, Internet of Things (IoT)-based data, augmented reality (AR), virtual reality (VR), live VR/AR in combination with social networking services (SNS), autonomous navigation, and Sync View (real-time video user transmissions using ultra-small cameras) necessitate communications methods (e.g., 5th generation (5G) communications and millimeter wave (mmWave) communications) that can support the transmission and reception of large amounts of data.

The antenna module of mmWave communications, including 5G communications, is being standardized and commercialized to efficiently deliver the needed data capacity.

SUMMARY

This Summary is provided to introduce a selection of concepts in a simplified form that are further described below in the Detailed Description. This Summary is not intended to identify key features or essential features of the claimed subject matter, nor is it intended to be used as an aid in determining the scope of the claimed subject matter.

An aspect of the present disclosure is to provide a radio-frequency module and an electronic device including the same.

In one general aspect, a radio-frequency device includes a radio-frequency module. The radio-frequency module includes a first substrate, a second substrate, a radio-frequency integrated circuit (RFIC), a front-end integrated circuit (FEIC), and a flexible substrate. The first substrate includes a first lower connection member in which at least one first lower insulating layer and at least one first lower wiring layer are alternately stacked, a first core member disposed above the first lower connection member, and a first upper insulating layer disposed above the first core member. The second substrate includes a second lower connection member in which at least one second lower insulating layer and at least one second lower wiring layer are alternately stacked, a second core member disposed above the second lower connection member, and a second upper insulating layer disposed above the second core member. The RFIC has at least a portion surrounded by the first core member and is configured to input or output a base signal and a first radio-frequency (RF) signal having a frequency higher than a frequency of the base signal. The FEIC has at least a portion surrounded by the second core member and is configured to input or output the first RF signal and a second RF signal having a power different from a power of the first RF signal. The flexible substrate is configured to connect the first and second substrates to each other, provide a transmission path for the first RF signal, and being more flexible than the first and second substrates.

The RFIC may be disposed between the at least one first lower insulating layer and the first upper insulating layer, and the FEIC may be disposed between the at least one second lower insulating layer and the second upper insulating layer.

The device may further include a cover metal layer disposed between the first core member and the first upper insulating layer or between the second core member and the second upper insulating layer, and disposed to overlap the RFIC or the FEIC in a vertical direction.

The device may further include a second antenna configured to transmit or receive the second RF signal and disposed on the second substrate.

The device may further include a second core via electrically connected to the at least one second lower wiring layer and disposed to penetrate through the second core member. The second antenna may be electrically connected to the second core via and is disposed above the second core member or above the FEIC.

The device may further include a first core via electrically connected to the at least one first lower wiring layer and disposed to penetrate through the first core member, and a first antenna electrically connected to the first core via and disposed above the first core member or above the RFIC.

The device may further include a second FEIC having at least a portion surrounded by the first core member and configured to input or output a third RF signal and a fourth RF signal having a power different from a power of the third RF signal. The first antenna may be configured to transmit or receive the fourth RF signal.

The device may further include a second FEIC having at least a portion surrounded by the first core member and configured to input or output a third RF signal and a fourth RF signal having a power different from a power of the third RF signal.

The device may further include a cover metal layer disposed between the first core member and the first upper insulating layer and disposed to overlap the RFIC or the second FEIC in a vertical direction. A portion of the first core member may be disposed between the RFIC and the second FEIC.

The device may further include a power management integrated circuit (PMIC) having at least a portion surrounded by the first core member or the second core member, and may be configured to supply power to at least one of the RFIC and the FEIC.

The flexible substrate may include a liquid crystal polymer.

The flexible substrate may be configured to orthogonally connect the first substrate to the second substrate.

The device may further include a plurality of radio-frequency modules having a same configuration as the radio-frequency module.

The device may be a smartphone, a personal digital assistant, a digital video camera, a digital still camera, a network system, a computer, a monitor, a tablet PC, a laptop computer, a netbook computer, a television set, a video game console, a smartwatch, or an automobile.

In another general aspect, a radio-frequency device includes radio-frequency module. The radio-frequency module includes a first substrate, a second substrate, a radio-frequency integrated circuit (RFIC), a front-end integrated circuit (FEIC), a second antenna, and a flexible substrate. The first substrate includes a first lower connection member in which at least one first lower insulating layer and at least one first lower wiring layer are alternately stacked, a first core member disposed above the first lower connection member, and a first upper insulating layer disposed above the first core member. The second substrate includes a second lower connection member in which at least one second lower insulating layer and at least one second lower wiring layer are alternately stacked. The RFIC has at least a portion surrounded by the first core member and configured to input or output a base signal and a first radio-frequency (RF) signal having a frequency higher than a frequency of the base signal. The FEIC has at least a portion surrounded by the first core member and configured to input or output the first RF signal and a second RF signal having a power different from a power of the first RF signal. The second antenna is configured to transmit or receive the second RF signal and disposed on the second substrate. The flexible substrate is configured to connect the first and second substrates to each other, provide a transmission path of the second RF signal, and being more flexible than the first and second substrates.

The second substrate may further include a second core member, disposed above the second lower connection member, and a second upper insulating layer being disposed above the second core member. The second core member may further include a second core via electrically connected to the at least one second lower wiring layer and disposed to penetrate through the second core member. The second antenna may be electrically connected to the second core via and is disposed above the second core member.

The device may further include a first core via electrically connected to the at least one first lower wiring layer and disposed to penetrate through the first core member, and a first antenna electrically connected to the first core via and disposed above at least one of the first core member, the RFIC, and the FEIC.

The RFIC may be disposed between the at least one first lower insulating layer and the first upper insulating layer, and the FEIC may be disposed between the at least one first lower insulating layer and the first upper insulating layer.

The device may further include a cover metal layer disposed between the first core member and the first upper insulating layer and disposed to overlap the RFIC or the FEIC in a vertical direction. A portion of the first core member may be disposed between the RFIC and the FEIC.

The flexible substrate may be configured to orthogonally connect the first substrate to the second substrate.

The device may further include a plurality of radio-frequency modules having a same configuration as the radio-frequency module.

The device may be a smartphone, a personal digital assistant, a digital video camera, a digital still camera, a network system, a computer, a monitor, a tablet PC, a laptop computer, a netbook computer, a television set, a video game console, a smartwatch, or an automobile.

In another general aspect, an electronic device includes a base substrate and a radio-frequency module. The radio-frequency module is electrically connected to the base substrate. The radio-frequency module includes a first substrate, a second substrate, a radio-frequency integrated circuit (RFIC), a front-end integrated circuit (FEIC), and a flexible substrate. The first substrate includes a first lower connection member in which at least one first lower insulating layer and at least one first lower wiring layer are alternately stacked, a first core member being disposed above the first lower connection member, and a first upper insulating layer being disposed above the first core member. The second substrate includes a second lower connection member in which at least one second lower insulating layer and at least one second lower wiring layer are alternately stacked, a second core member being disposed above the second lower connection member, and a second upper insulating layer being disposed above the second core member. The RFIC has at least a portion surrounded by the first core member and configured to input or output a base signal and a first radio-frequency (RF) signal having a frequency higher than a frequency of the base signal. The FEIC has at least a portion surrounded by the second core member and configured to input or output the first RF signal and a second RF signal, having a power different from a power of the first RF signal. The flexible substrate is configured to connect the first and second substrates to each other, provide a transmission path of the first RF signal, and be more flexible than the first and second substrates.

The second substrate may further include a plurality of second substrates and the flexible substrate may include a plurality of flexible substrates.

Each of the plurality of second substrates may include a second antenna configured to transmit or receive the second RF signal.

Other features and aspects will be apparent from the following detailed description, the drawings, and the claims.

BRIEF DESCRIPTION OF DRAWINGS

Throughout the drawings and the detailed description, the same reference numerals refer to the same elements. The drawings may not be to scale, and the relative size, proportions, and depiction of elements in the drawings may be exaggerated for clarity, illustration, and convenience.

DETAILED DESCRIPTION

Figure 1A:
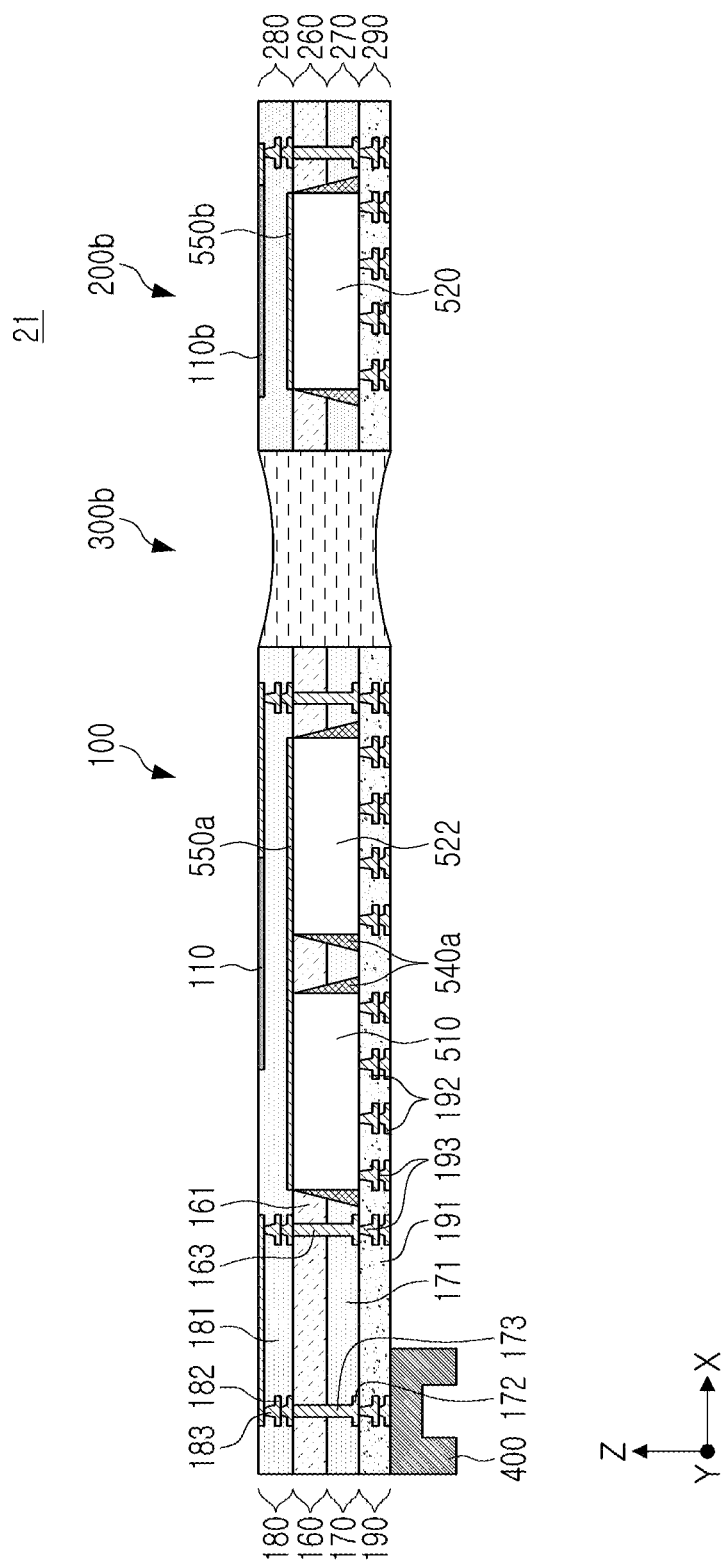
FIGS. 1A to 1F are side views illustrating a first IC-embedded structure of a radio-frequency module according to an embodiment of the present disclosure.

The following detailed description is provided to assist the reader in gaining a comprehensive understanding of the methods, apparatuses, and/or systems described herein. However, various changes, modifications, and equivalents of the methods, apparatuses, and/or systems described herein will be apparent after an understanding of the disclosure of this application. For example, the sequences of operations described herein are merely examples, and are not limited to those set forth herein, but may be changed as will be apparent after an understanding of the disclosure of this application, with the exception of operations necessarily occurring in a certain order. Also, descriptions of features that are known in the art may be omitted for increased clarity and conciseness.

The features described herein may be embodied in different forms, and are not to be construed as being limited to the examples described herein. Rather, the examples described herein have been provided merely to illustrate some of the many possible ways of implementing the methods, apparatuses, and/or systems described herein that will be apparent after an understanding of the disclosure of this application.

Throughout the specification, when an element, such as a layer, region, or substrate, is described as being "on," "connected to," or "coupled to" another element, it may be directly "on," "connected to," or "coupled to" the other element, or there may be one or more other elements intervening therebetween. In contrast, when an element is described as being "directly on," "directly connected to," or "directly coupled to" another element, there can be no other elements intervening therebetween.

As used herein, the term "and/or" includes any one and any combination of any two or more of the associated listed items.

Although terms such as "first," "second," and "third" may be used herein to describe various members, components, regions, layers, or sections, these members, components, regions, layers, or sections are not to be limited by these terms. Rather, these terms are only used to distinguish one member, component, region, layer, or section from another member, component, region, layer, or section. Thus, a first member, component, region, layer, or section referred to in examples described herein may also be referred to as a second member, component, region, layer, or section without departing from the teachings of the examples.

Spatially relative terms such as "above," "upper," "below," and "lower" may be used herein for ease of description to describe one element's relationship to another element as shown in the figures. Such spatially relative terms are intended to encompass different orientations of the device in use or operation in addition to the orientation depicted in the figures. For example, if the device in the figures is turned over, an element described as being "above" or "upper" relative to another element will then be "below" or "lower" relative to the other element. Thus, the term "above" encompasses both the above and below orientations depending on the spatial orientation of the device. The device may also be oriented in other ways (for example, rotated by 90 degrees or at other orientations), and the spatially relative terms used herein are to be interpreted accordingly.

The terminology used herein is for describing various examples only, and is not to be used to limit the disclosure. The articles "a," "an," and "the" are intended to include the plural forms as well, unless the context clearly indicates otherwise. The terms "comprises," "includes," and "has" specify the presence of stated features, numbers, operations, members, elements, and/or combinations thereof, but do not preclude the presence or addition of one or more other features, numbers, operations, members, elements, and/or combinations thereof.

FIGS. 1A to 1F are side views illustrating a first IC-embedded structure of a radio-frequency module according to an embodiment of the present disclosure.

In FIG. 1A, a radio-frequency module 21 according to an embodiment may include a radio-frequency integrated circuit (RFIC) 510 and a front-end integrated circuit (FEIC) 520.

The RFIC 510 may input and/or output a base signal and a first radio-frequency (RF) signal having a frequency higher than a frequency of the base signal.

For example, the RFIC 510 may process the base signal to generate the first RF signal and may process the first RF signal to generate the base signal. In this case, the signal processing may be, for example, frequency conversion, filtering, phase control, or the like. The base signal may be input/output to an external entity (for example, a base substrate) through a connector 400 disposed on a first substrate 100.

The FEIC 520 may input and/or output the first RF signal and a second RF signal, having a power different from the power of the first RF signal.

For example, the FEIC 520 may amplify the first RF signal to generate the second RF signal and may amplify the second RF signal to generate the first RF signal. An antenna may remotely transmit the amplified second RF signal, and the second RF signal remotely received from the antenna may be amplified by the FEIC 520.

For example, the FEIC 520 may include one or more portions of a power amplifier, a low-noise amplifier, and a transmission/reception switch. The power amplifier, the low-noise amplifier, and the transmission/reception may be implemented as a combined structure of a semiconductor transistor element and an impedance element, but the present disclosure is not limited thereto.

Since the FEIC 520 can amplify the first RF signal and/or the second RF signal, the RFIC 510 may not include a front-end amplification circuit (for example, a power amplifier or a low-noise amplifier).

Since securing performance (for example, power consumption, linearity properties, noise properties, size, and gain) of the front-end amplification circuit may be more difficult than securing performance of a circuit that performs operations other than the front-end amplification operation in the RFIC 510, compatibility for a circuit that performs operations other than the front-end amplification operation in the RFIC 510 may be relatively low.

For example, the front-end amplification circuit may be implemented as a type of IC other than a conventional CMOS-based IC (for example, a compound semiconductor), may be configured to have an efficient structure to receive an impedance of a passive device, or may be optimized for specific performance and need to be implemented separately to secure the performance.

Therefore, the radio-frequency module 21 may have a structure in which the FEIC 520, performing a front-end amplification operation, and the RFIC 510, performing an operation other than the front-end amplification operation, are separately implemented to secure both performances of the front-end amplification circuit and performance of a circuit for performing an operation other than the front-end amplification operation in the RFIC 510.

In addition, power consumption and/or heat generation of the front-end amplification circuit may be greater than power consumption and/or heat generation of the circuit performing an operation other than the front-end amplification operation in the RFIC 510.

The radio-frequency module 21 may have a structure in which the FEIC 520 performing the front-end amplification operation and the RFIC 510 performing an operation other than the front-end amplification operation are implemented separately to increase power consumption efficiency, and to disperse heating paths more efficiently.

Energy loss in transmission of the first RF signal and/or the second RF signal may increase as powers of the first RF signal and/or the second RF signal increase. By separately implementing the FEIC 520 performing the front-end amplification operation and the RFIC 510 performing an operation other than the front-end amplification operation, the FEIC 520 may be electrically closely connected to the antenna. Therefore, an electrical length of a transmission path of the finally amplified second RF signal to the antennal may be shortened more efficiently, and the energy efficiency of the radio-frequency module 21 may be further improved.

Although a total size of the RFIC 510 and the FEIC 520 may be larger than a size of an RFIC including an integrated front-end amplifier circuit, the radio-frequency module 21 may have a structure, capable of efficiently mitigating an increase in size caused by the separation of the RFIC 510 and the FEIC 520, and may easily utilize advantages resulting from the separation of the RFIC 510 and the FEIC 520.

In FIG. 1A, the radio-frequency module 21 may include a first substrate 100, a second substrate 200b, and a flexible substrate 300b.

The first substrate 100 may include a first lower connection member 190, a first core member 160, and a first upper connection member 180. The second substrate 200b may include a second lower connection member 290, a second core member 260, and a second upper connection member 280.

The first lower connection member 190 may have a first stacked structure in which at least one first lower insulating layer 191 and at least one first lower wiring layer 192 are alternately stacked. The first lower wiring layer 192 may provide a transmission path of the base signal and the first RF signal.

For example, the first stacked structure may be similar to a structure of a printed circuit board (PCB). The at least one first lower insulating layer 191 may provide an arrangement space of a first lower via 193. The first lower via 193 may be electrically connected to the first lower wiring layer 192. It may extend in a direction perpendicular to the lower wiring layer 192 (for example, a Z direction).

The second lower connection member 290 may have a second stacked structure in which at least one second lower insulating layer and at least one second lower wiring layer are alternately stacked. The second lower wiring layer may provide transmission paths of the first and second RF signals. For example, the second stacked structure may be implemented in the same manner as the first stacked structure.

For example, the first and second lower connection members 190 and 290 may have a structure built up from lower surfaces of the first and second core members 160 and 260 to a lower side (for example, a −Z direction). Accordingly, the first and second lower vias 193 may have a structure in which a lower end has a greater width than an upper end.

The first upper connection member 180 may have a third stacked structure in which at least one first upper insulating layer 181 and at least one first upper wiring layer 182 are alternately stacked. The first upper wiring layer 182 may provide a transmission path of the second RF signal. For example, the third stacked structure may be implemented in the same manner as the first stacked structure.

The second upper connection member 280 may have a fourth stacked structure in which at least one second upper insulating layer and at least one second upper wiring layer are alternately stacked. The second upper wiring layer may provide a transmission path of the second RF signal. For example, the fourth stacked structure may be implemented in the same manner as the third stacked structure.

At least one of the first and second upper wiring layers 182 may be omitted depending on the example.

For example, the first and second upper connection members 180 and 280 may have a structure built up the upper surfaces of the first and second core members 160 and 260 to an upper side (for example, a +Z direction). Accordingly, the first and second upper vias 183 may have a structure in which an upper end has a smaller width than a lower end.

The first core member 160 may include a first core insulating layer 161 and a first core via 163, and may be disposed between the first upper connection member 180 and the first lower connection member 190.

The second core member 260 may include a second core insulating layer and a second core via, and may be disposed between the second upper connection member 280 and the second lower connection member 290. The second core member 260 may be implemented in the same manner as the first core member 160.

The first and second core vias 163 may electrically connect the first and second lower vias 193 and the first and second upper vias 183 to each other. It may extend in a direction, perpendicular to the first and second core insulating layers 161 (for example, a Z direction). The first and second core insulating layers 161 may provide an arrangement space of the first and second core vias 163.

The first core member 160 may surround at least a portion of the RFIC 510, and the second core member 260 may surround at least a portion of the FEIC 520.

Accordingly, the RFIC 510 may be embedded in the first substrate 100, and the FEIC 520 may be embedded in the second substrate 200b.

Therefore, since a thickness of the radio-frequency module 21 may be reduced by a thickness of the RFIC 510 or FEIC 520, the actual size of the radio-frequency module 21 may be reduced.

For example, the RFIC 510 may be disposed between the first lower insulating layer 191 and the first upper insulating layer 181, and the FEIC 520 may be disposed between the second lower insulating layer of the second lower connection member 290 and the second upper insulating layer of the second upper connection member 280.

Accordingly, the RFIC 510 and/or the FEIC 520 may be more independent of an external entity, and thus, may be more stably embedded in the first and second substrates 100 and 200b. In addition, the RFIC 510 and/or the FEIC 520 may be disposed to allow an input/output direction of a signal (for example, the +Z direction or the −Z direction) to be freer, and overall wiring complexity of the first and second substrates 100 and 200b may be further reduced.

The flexible substrate 300b may connect the first and second substrates 100 and 200b and may provide a transmission path of the first RF signal. In addition, the flexible substrate 300b may be more flexible than the first and second substrates 100 and 200b.

The flexibility of a substrate may be defined as the strength of a gradually increasing force when the force is applied to a specific point on the substrate before the substrate becomes damaged. Since the flexible substrate 300b is more flexible than the first and second substrates 100 and 200b, the flexible substrate 300b may be bent relatively easily.

For example, the flexible substrate 300b may include a liquid crystal polymer (LCP). Since the LCP may have higher flexibility than a common insulating layer of a printed circuit board and may have a relatively low dissipation factor, transmission loss of the first RF signal may be reduced. Depending on the example, the flexible substrate 300b may be replaced with a relatively flexible insulating material such as polyimide, instead of an LCP.

As the flexible substrate 300b is bent, the structure of the radio-frequency module 21 may be more adaptive to a peripheral structure of the radio-frequency module 21. Therefore, a degree of design freedom of the radio-frequency module 21 may be further increased, and an effective size of the radio-frequency module 21 may be further reduced.

As described above, since the radio-frequency module 21 provides a structure, in which the RFIC 510 and the FEIC 520 are embedded in the first and second substrates 100 and 200b, and has a further reduced effective size, it may have a structure, capable of easily mitigating an increase in size due to the separation of the RFIC 510 and the FEIC 520, and may easily utilize advantages resulting from the separation of the RFIC 510 and the FEIC 520.

In addition, as the flexible substrate 300b is bent, an increased limitation of a total area of the first and second substrates 100 and 200b in a horizontal direction, caused by the peripheral structure of the radio-frequency module 21, may be alleviated in the radio-frequency module 21.

Accordingly, the total area of the first and second substrates 100 and 200b in the horizontal direction may be more easily increased. When the total area of the first and second substrates 100 and 200b in the horizontal direction is increased, the possibility of layer warpage, caused by providing the IC arrangement space of the first and second substrates 100 and 200b, may be reduced. For example, a total area of the IC arrangement space in the first and second substrates 100 and 200b may be more easily increased, and the total number of IC arrangement spaces may be more easily increased.

In addition, since the flexible substrate 300b may be disposed between the RFIC 510 and the FEIC 520, a degree of electromagnetic isolation between the RFIC 510 and the FEIC 520 may also be improved.

In FIG. 1A, the radio-frequency module 21 may further include a second antenna 110b and/or a first antenna 110.

Accordingly, the radio-frequency module 21 may provide a means for not only processing the first and second RF signals but also remotely transceiving the second RF signal.

The second antenna 110b may be configured to transmit or receive the second RF signal remotely and may be disposed on the second substrate 200b.

A radiation pattern concentration direction of the second antenna 110b may correspond to an angle at which an upper surface of the second substrate 200b is inclined. Since the angle, at which the upper surface of the second substrate 200b is inclined, may be varied as the flexible substrate 300b is bent, the radiation pattern concentration direction of the second antenna 110b may be variously set. Therefore, the radio-frequency module 21 may have transmission and reception directions of the second RF signal adaptively set to the peripheral structure of the radio-frequency module 21, and may have wider communications coverage.

In addition, since the second antenna 110b and the FEIC 520 are disposed on the second substrate 200b, transmission loss of the second RF signal may also be reduced. Since the second antenna 110b remotely transmits and receives the second RF signal, overall energy efficiency of the radio-frequency module 21 may be more sensitive to transmission loss of the second RF signal than transmission loss of the first RF signal. Accordingly, when the second antenna 110b and the FEIC 520 are disposed on the second substrate 200b, the energy efficiency of the radio-frequency module 21 may be further improved.

For example, the second antenna 110b may be electrically connected to a second core via of the second core member 260, and may be disposed above the second core member 260 or above the FEIC 520.

Accordingly, the second upper connection member 280 may include a second upper wiring layer designed to further focus on antenna performance, and the second lower connection member 290 may include a second lower wiring layer designed to further focus on the transmission efficiency of the second RF signal. Therefore, antenna performance (for example, gain and bandwidth) of the radio-frequency module 21 and transmission efficiency of the second RF signal may be improved.

The first antenna 110 may be disposed on the first substrate 100. As the flexible substrate 300b is bent, an angle formed by the radiation pattern concentration direction of the first antenna 110 and the radiation pattern concentration direction of the second antenna 110b may be varied. Thus, the radio-frequency module 21 may remotely transmit and receive a second RF signal in a plurality of directions and may have wider communications coverage based on various combinations of the plurality of directions.

For example, the first antenna 110 may be electrically connected to the first core via 163 of the first core member 160 and may be disposed above the first core member 160 or above the RFIC 510.

Accordingly, the first upper connection member 180 may include a first upper wiring layer 182 designed to further focus on antenna performance, and the first lower connection member 190 may include a first lower wiring layer 192 designed to further focus on transmission efficiency of the second RF signal. Therefore, antenna performance (for example, gain and bandwidth) of the radio-frequency module 21 and transmission efficiency of the second RF signal may be improved.

Figure 1B:
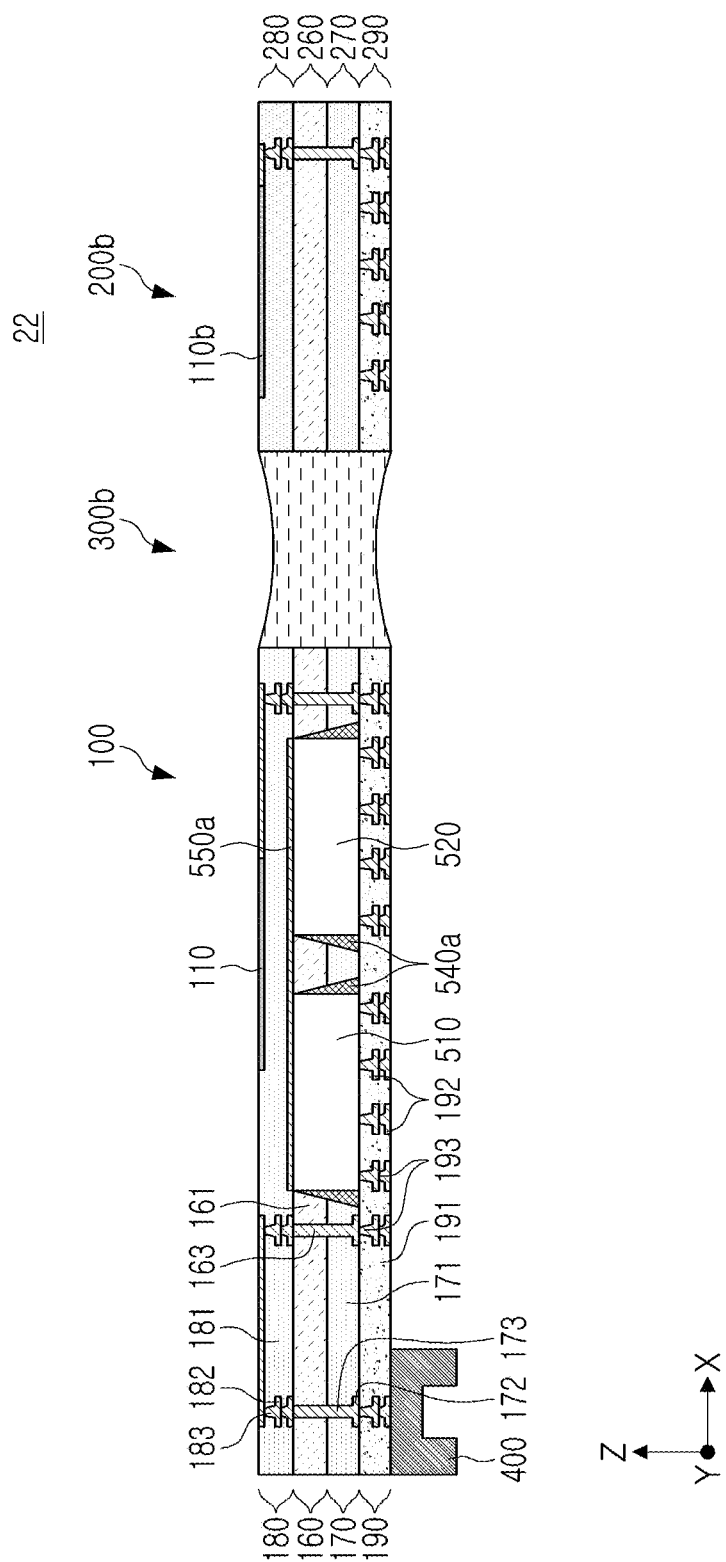
Figure 1C:
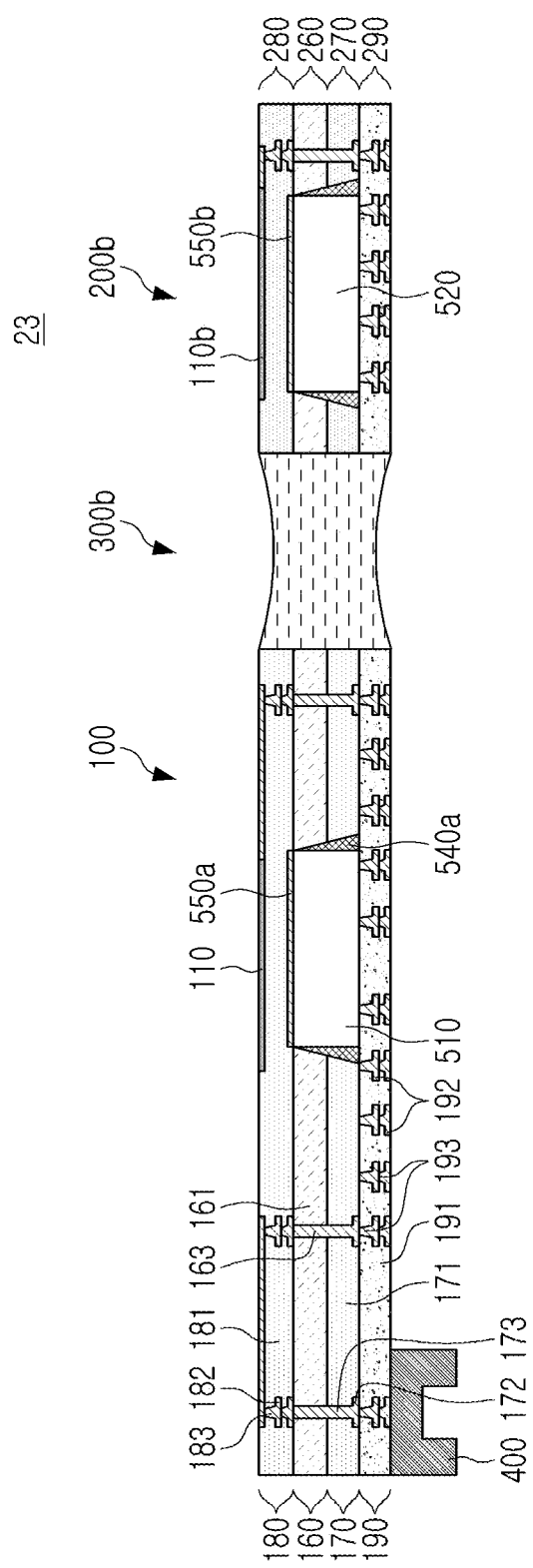

In FIGS. 1A to 1C, first and second antennas 110 and 110b of radio-frequency modules 21, 22, and 23, according to an embodiment, may be implemented as patch antennas and may be configured to have a polygonal or circular pattern in first and second upper wiring layers 182.

Figure 1D:
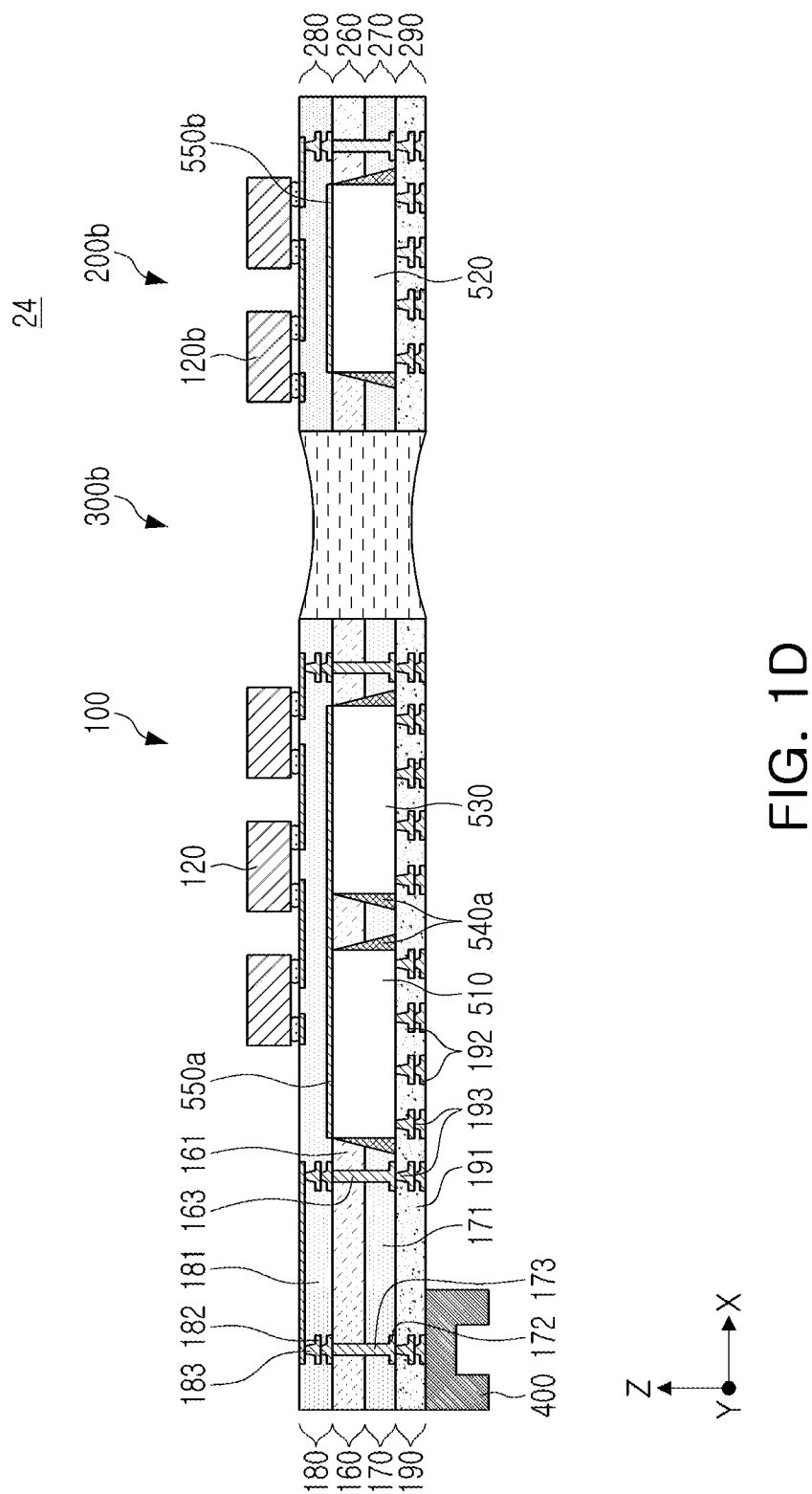
Figure 1E:
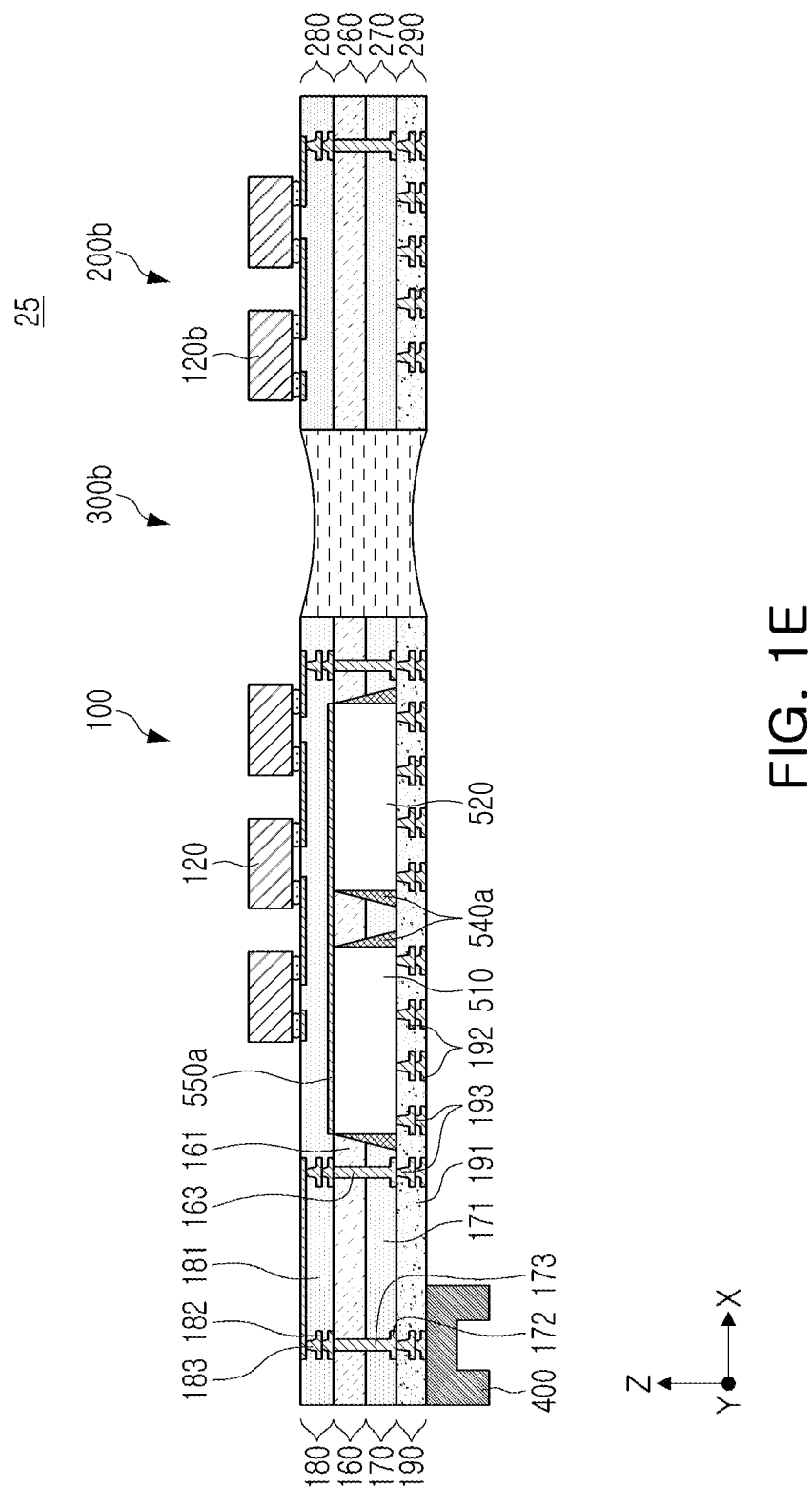
Figure 1F:
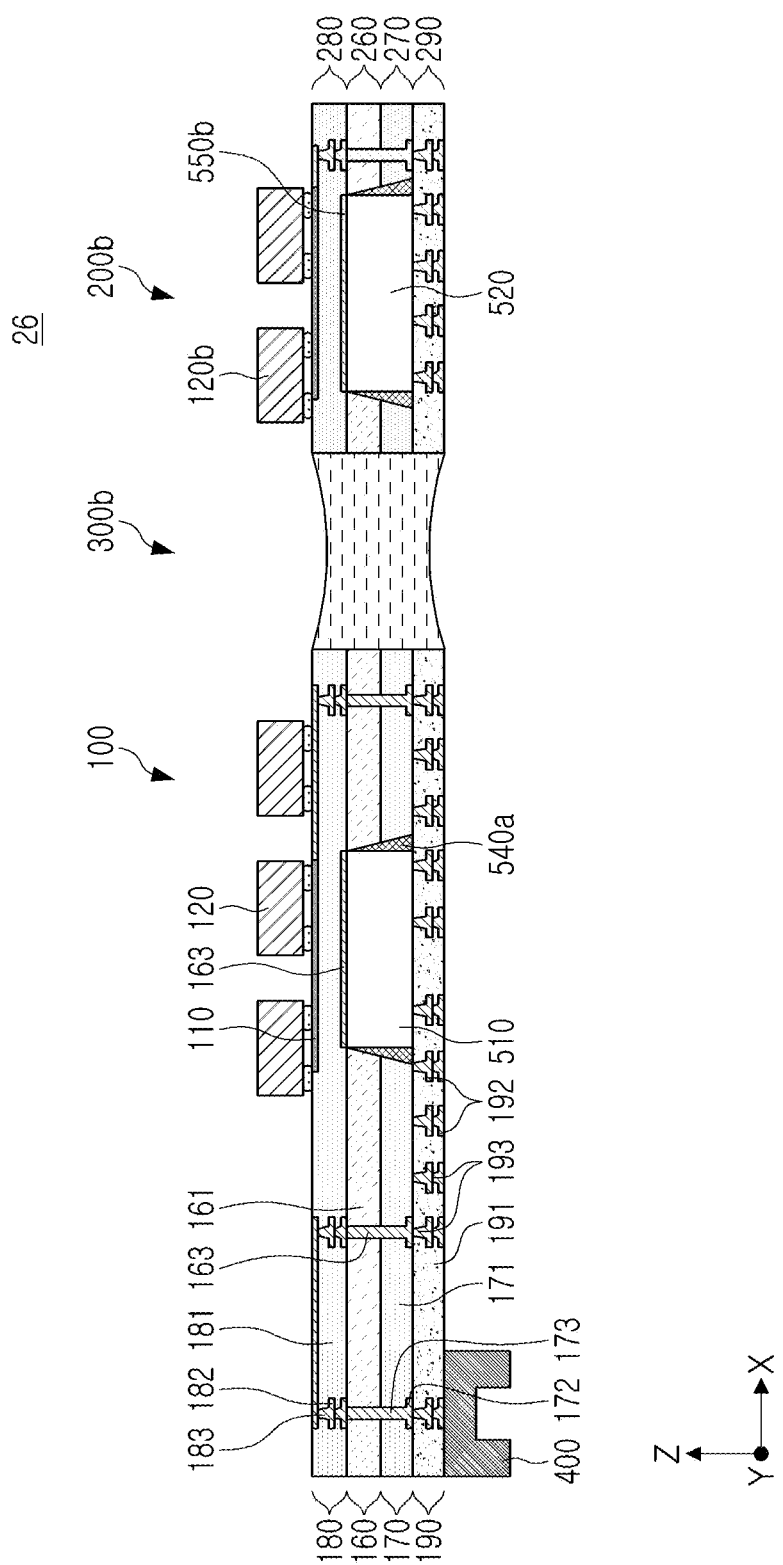
Figure 2A:
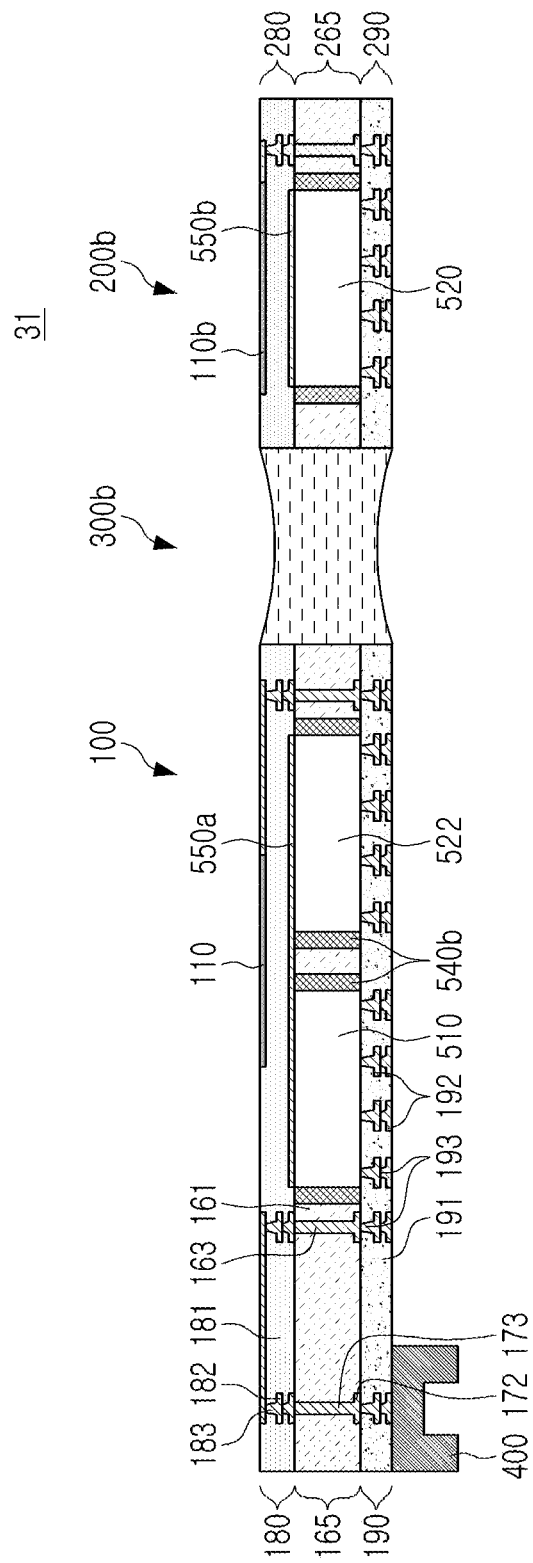
FIGS. 2A to 2F are side views illustrating a second IC-embedded structure of a radio-frequency module according to an embodiment of the present disclosure.
Figure 2B:
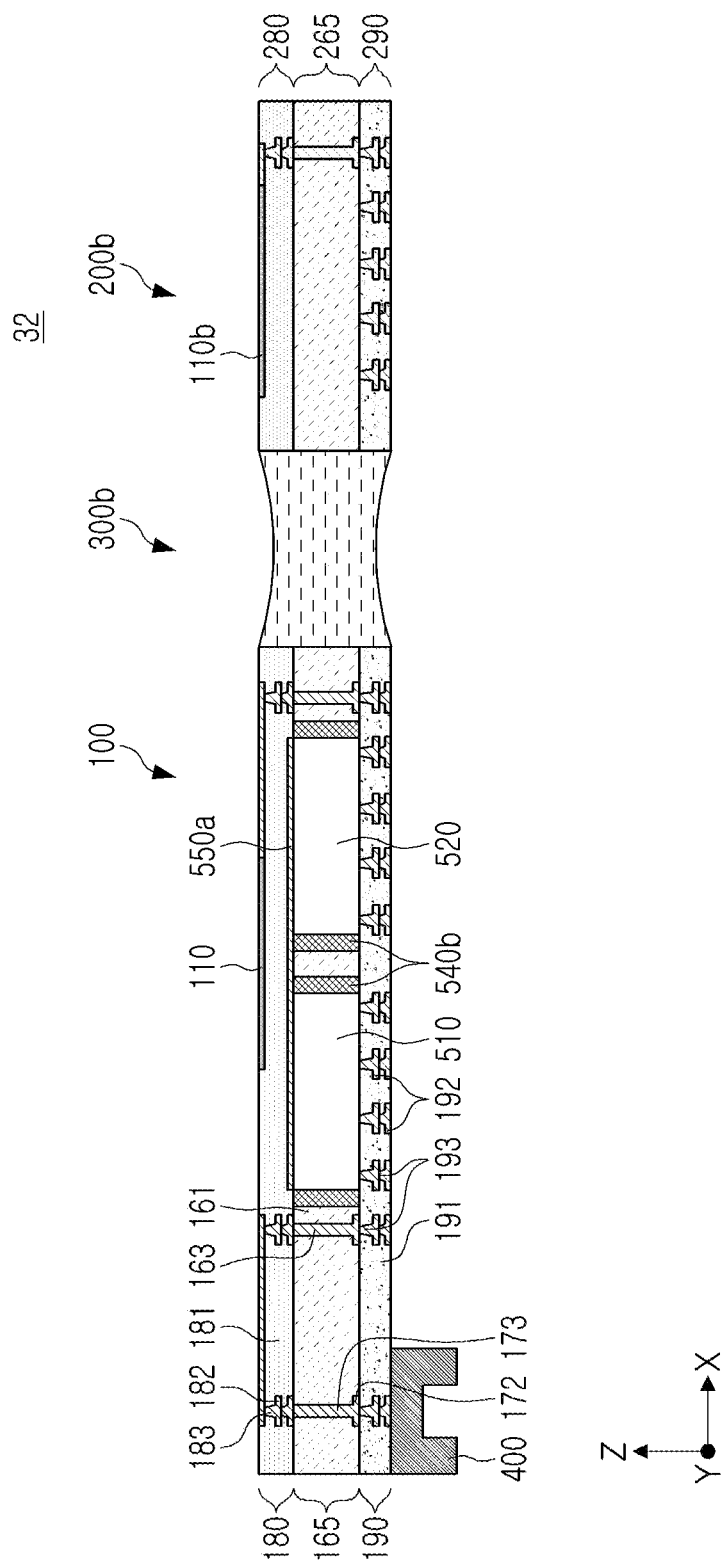
Figure 2C:
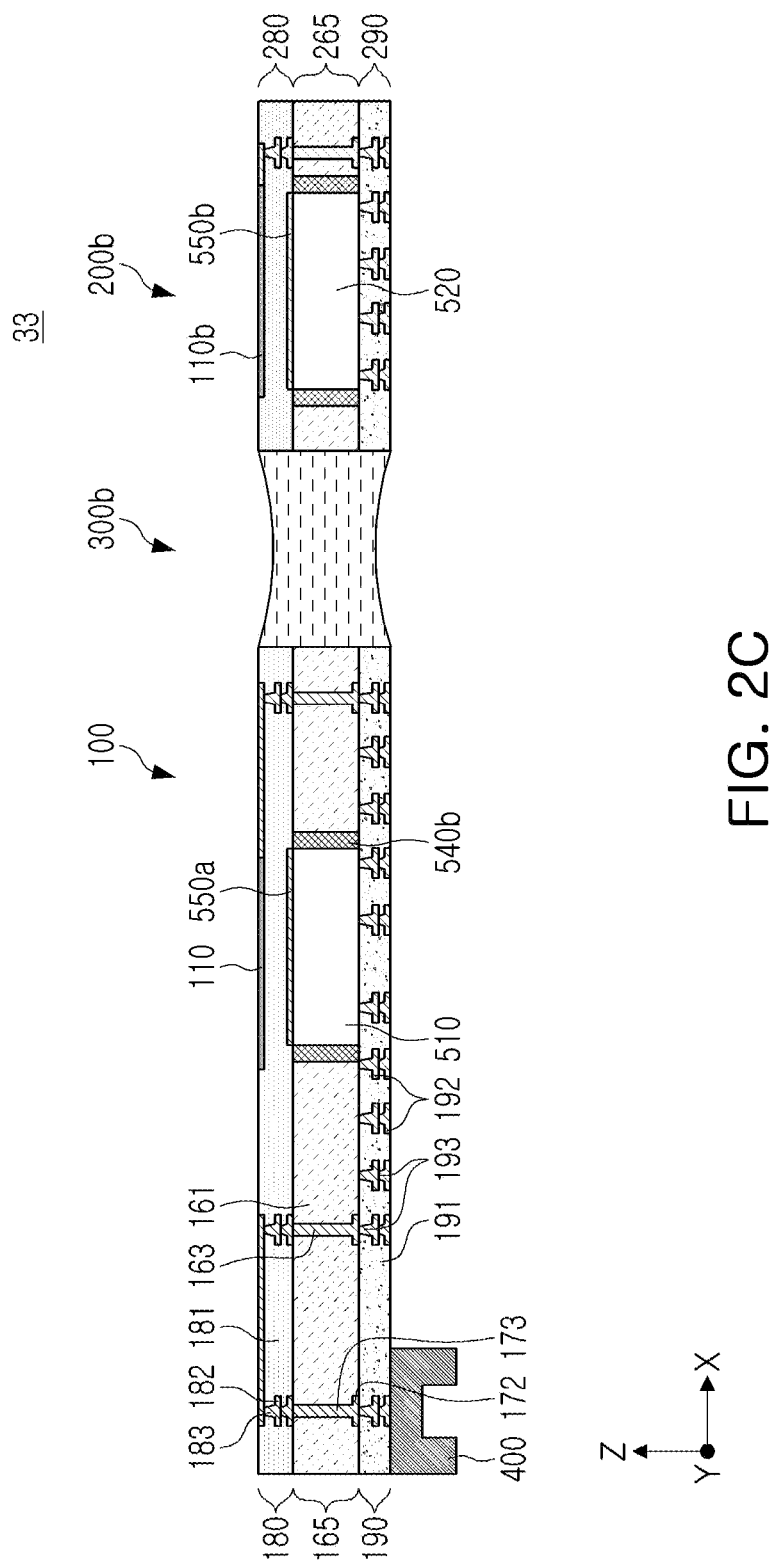
Figure 2D:
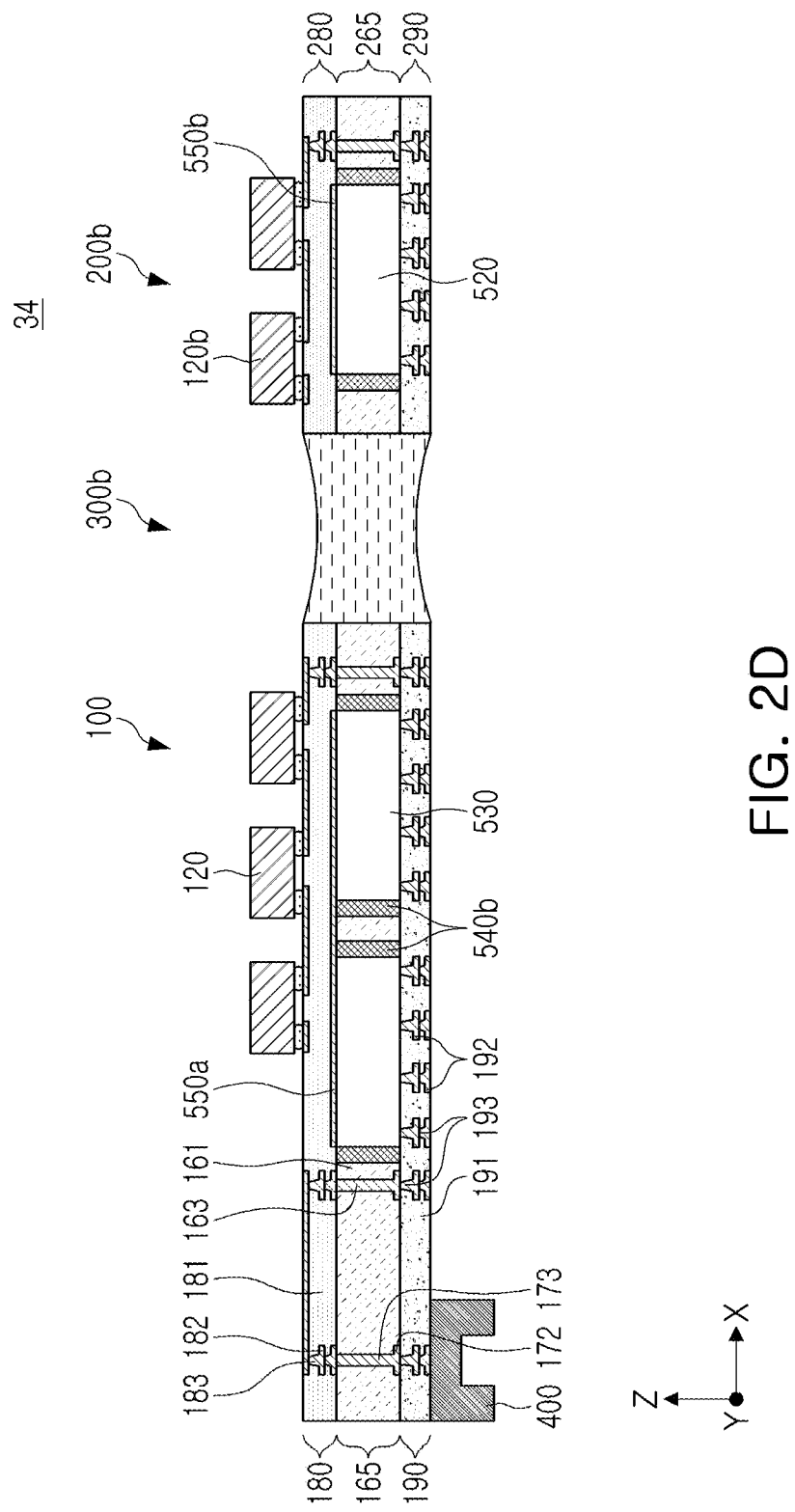
Figure 2E:
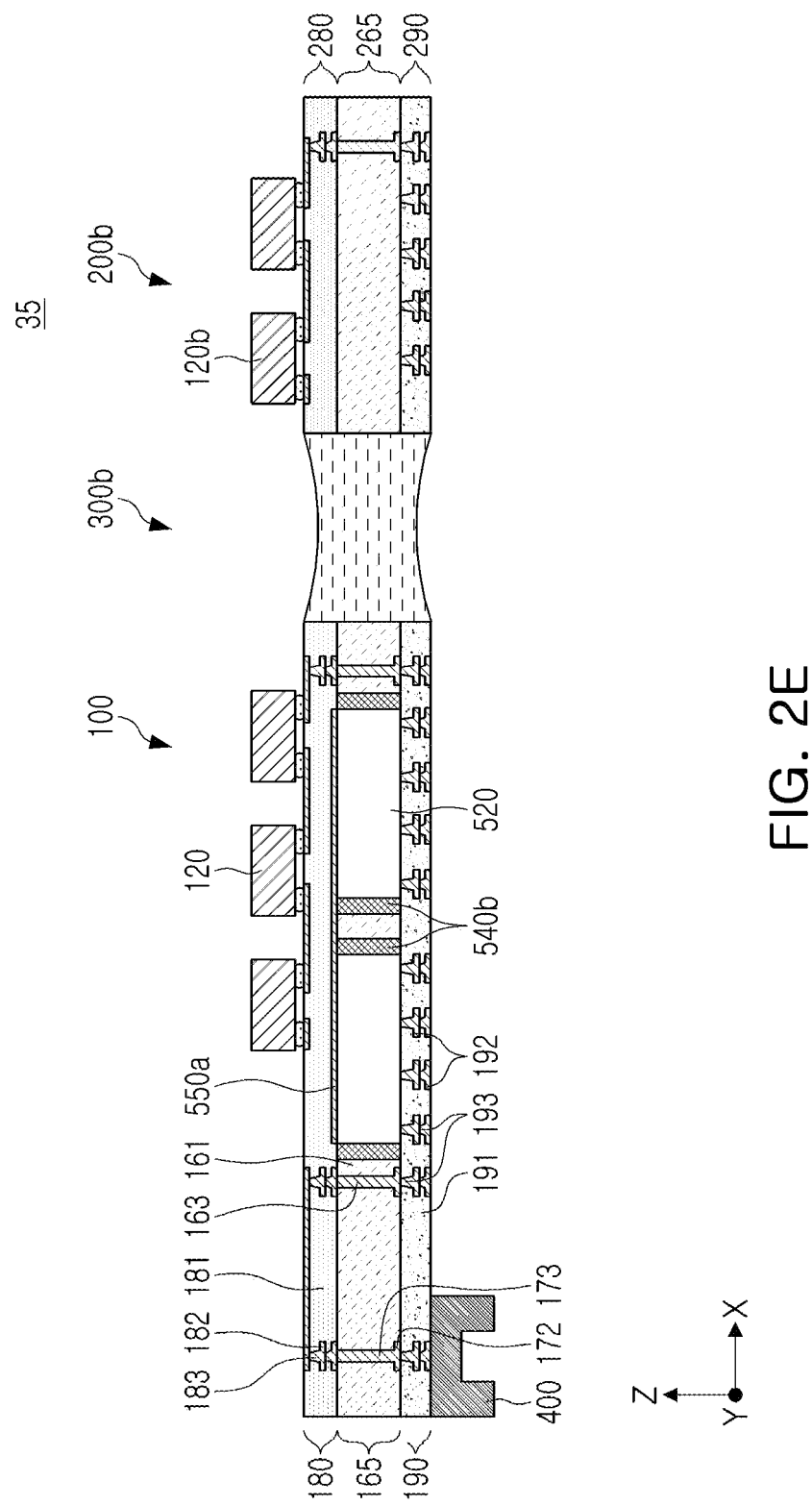
Figure 2F:
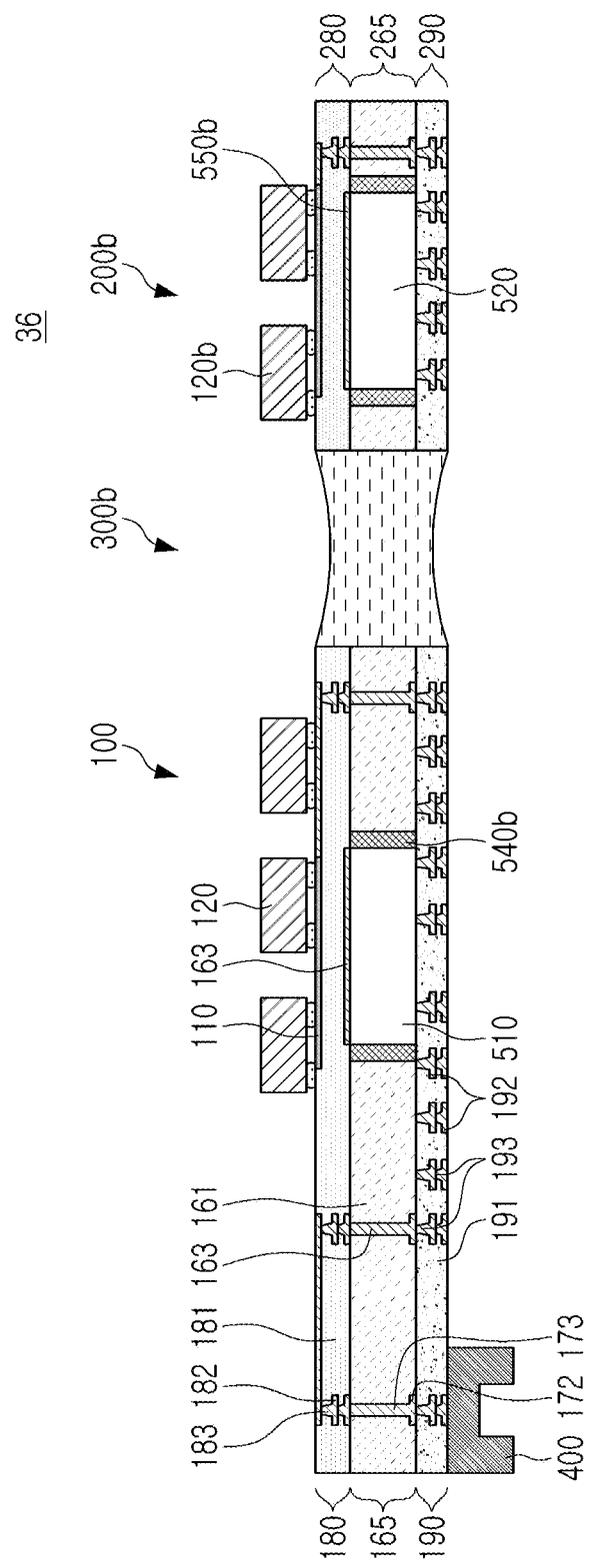

In FIGS. 1D to 1F, the first and second antennas 120 and 120b of radio-frequency modules 24, 25, and 26, according to an embodiment, may be implemented as antenna components and may be mounted on upper surfaces of first and second substrates 100 and 200b. For example, the antenna component may include a patch antenna and may include a dielectric substance (for example, ceramic) having a higher dielectric constant than the first and second upper insulating layers 181.

In FIG. 1A, the radio-frequency module 21 may further include a second FEIC 522.

The second FEIC 522 may have at least a portion surrounded by the first core member 160 and may input or output a third RF signal and a fourth RF signal, having a power different from the power of the third RF signal. The second FEIC may be implemented in substantially the same manner as the FEIC 520.

Depending on the example, the first antenna 110 may be configured to remotely transmit or receive the fourth RF signal, instead of the second RF signal. Since the first antenna 110 and the second FEIC 522 are disposed on the first substrate 100, transmission loss of the fourth RF signal may be reduced, and the energy efficiency of the radio-frequency module 21 may be further improved.

In FIG. 1D, a radio-frequency module 24, according to an embodiment, may further include a power management integrated circuit (PMIC) 530.

The PMIC 530 may have at least a portion surrounded by a first core member 160 or a second core member 260, and may supply power to at least one of an RFIC 510 and an FEIC 520.

In the radio-frequency module 24, a total area of an IC arrangement space in the first and second substrates 100 and 200b may be more easily increased, and the total number of IC arrangement spaces may be more easily increased. Therefore, the radio-frequency module 24 may efficiently provide an arrangement space of the PMIC 530.

In FIGS. 1A to 1F, the radio-frequency modules 21, 22, 23, 24, 25, and 26 may further include cover metal layers 550a and 550b, and may also include a first internal connection member 170 and/or a second internal connection member 270.

The cover metal layers 550a and 550b may be disposed between the first core member 160 and the first upper connection member 180 and/or between the second core member 260 and the second upper connection member 280, and may be disposed to overlap the RFIC 510 and/or the FEIC 520 in a vertical direction (for example, a Z direction).

For example, the arrangement space of the RFIC 510 and the arrangement space of the FEIC 520 may be implemented as a blind cavity. The blind cavity may be formed from lower surfaces of first and second internal connection members 170 and 270 or lower surfaces of the first and second core members 160 and 260 in a state in which the first and second core members 160 and 260, the first and second internal connection members 170 and 270, and the first and second upper connection members 180 and 280 are stacked. The blind cavity may be formed by a method of irradiating a laser to the lower surfaces or a method of colliding fine particles (for example, a sandblasting method) on the lower surfaces.

The cover metal layers 550a and 550b may be used to determine the thickness of a process of forming the blind cavity. For example, lasers or fine particles may be irradiated or collide with each other until the cover metal layers 550a and 550b are exposed.

In addition, the cover metal layers 550a and 550b may improve a degree of electromagnetic isolation between the RFIC 510 and the first antennas 110 and 120, and may improve a degree of electromagnetic isolation between the FEIC 520 and the second antennas 110b and 120b.

The RFIC 510 and/or the FEIC 520 may be disposed on lower surfaces of the cover metal layers 550a and 550b. For example, an adhesive structure may be used during the arrangement of the RFIC 510 and/or the FEIC 520.

An encapsulant 540a may fill a portion of the blind cavity in which the RFIC 510 and the FEIC 520 are not disposed. For example, the encapsulant 540a may be implemented as a photo imageable encapsulant (PIE), an Ajinomoto Build-up Film (ABF), or an epoxy molding compound (EMC).

Depending on the example, a plurality of blind cavities may be formed in a single substrate. A portion of the first core member 160 may be disposed between the RFIC 510 and the second FEIC 522. Accordingly, a degree of electromagnetic isolation between the RFIC 510 and the second FEIC 522 may be improved.

Since the blind cavity may have a relatively smaller effect on the layer warpage of the substrate than a through-cavity, a larger number of blind cavities or a blind cavity having a larger size may be formed in a single substrate than a through cavity.

FIGS. 2A to 2F are side views illustrating a second IC-embedded structure of a radio-frequency module according to an embodiment of the present disclosure.

In FIGS. 2A to 2F, radio-frequency modules 31, 32, 33, 34, 35, and 36 according to an embodiment may include first and second core members 165 and 265, and first and second internal connection members may be omitted.

For example, an arrangement space of an RFIC 510 and an arrangement space of an FEIC 520 may be implemented as a through-cavity. The through-cavity may be formed by a method of intensively applying force to a specific location in a first core member 165 and/or a second core member 265 or by a method of irradiating a laser.

The RFIC 510 and/or the FEIC 520 may be disposed on an upper or lower surface of a film disposed on an upper or lower surface of the first core member 165 and/or the second core member 265 in a state in which a through-cavity is formed. The encapsulant 540b may fill a portion of the through-cavity in which the RFIC 510 and the FEIC 520 are not disposed.

Since the through-cavity may be more simply formed than the blind cavity, implementation efficiency of the radio-frequency modules 31, 32, 33, 34, 35, and 36 may be improved.

FIGS. 3A to 3D are perspective views illustrating an omnidirectional radiation structure of a radio-frequency module according to an embodiment of the present disclosure.

Figure 3A:
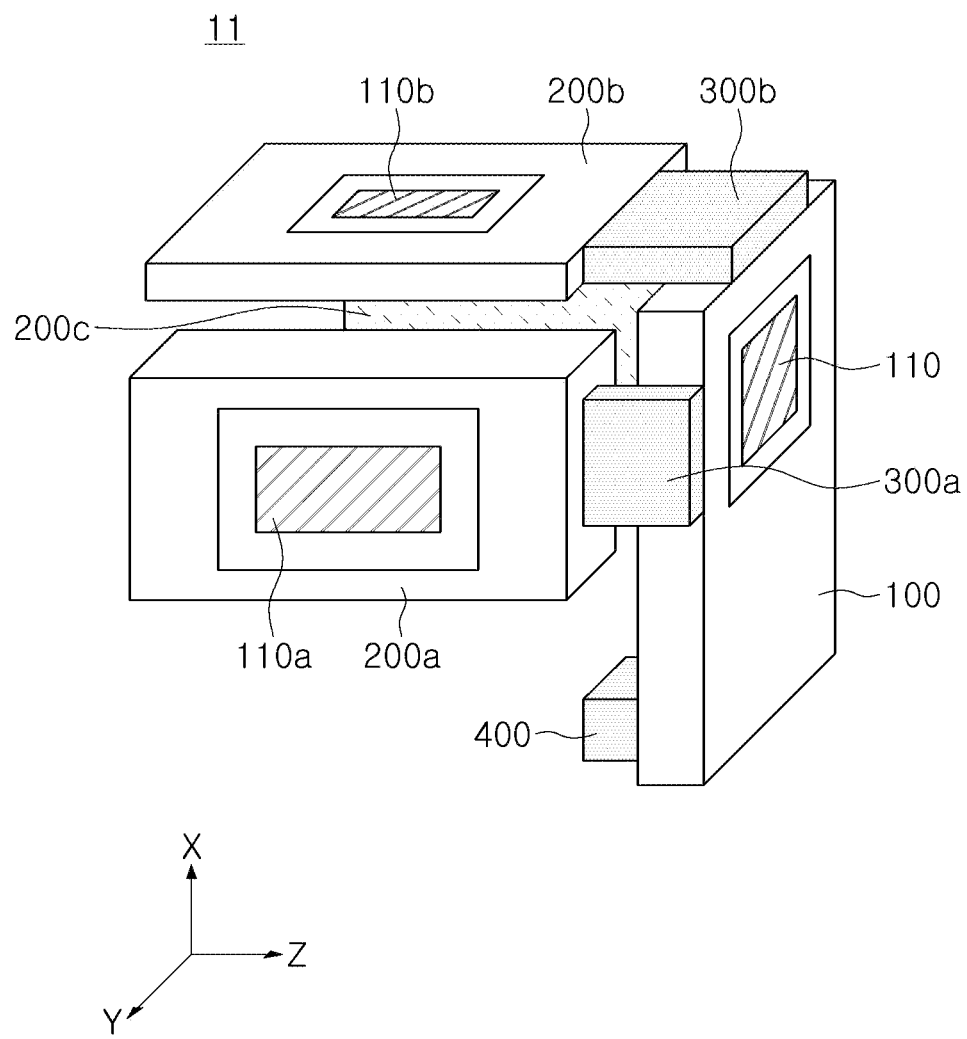
FIGS. 3A to 3D are perspective views illustrating an omnidirectional radiation structure of a radio-frequency module according to an embodiment of the present disclosure.

In FIG. 3A, a radio-frequency module 11, according to an embodiment, may include a first substrate 100, a plurality of second substrate 200a, 200b, and 200c, and a plurality of flexible substrates 300a and 300b. The plurality of second substrates 200a, 200b, and 200c may each include one of a plurality of second antennas 110a and 110b patterned on a second upper wiring layer of the plurality of second substrates 200a, 200b, and 200c.

Figure 3B:
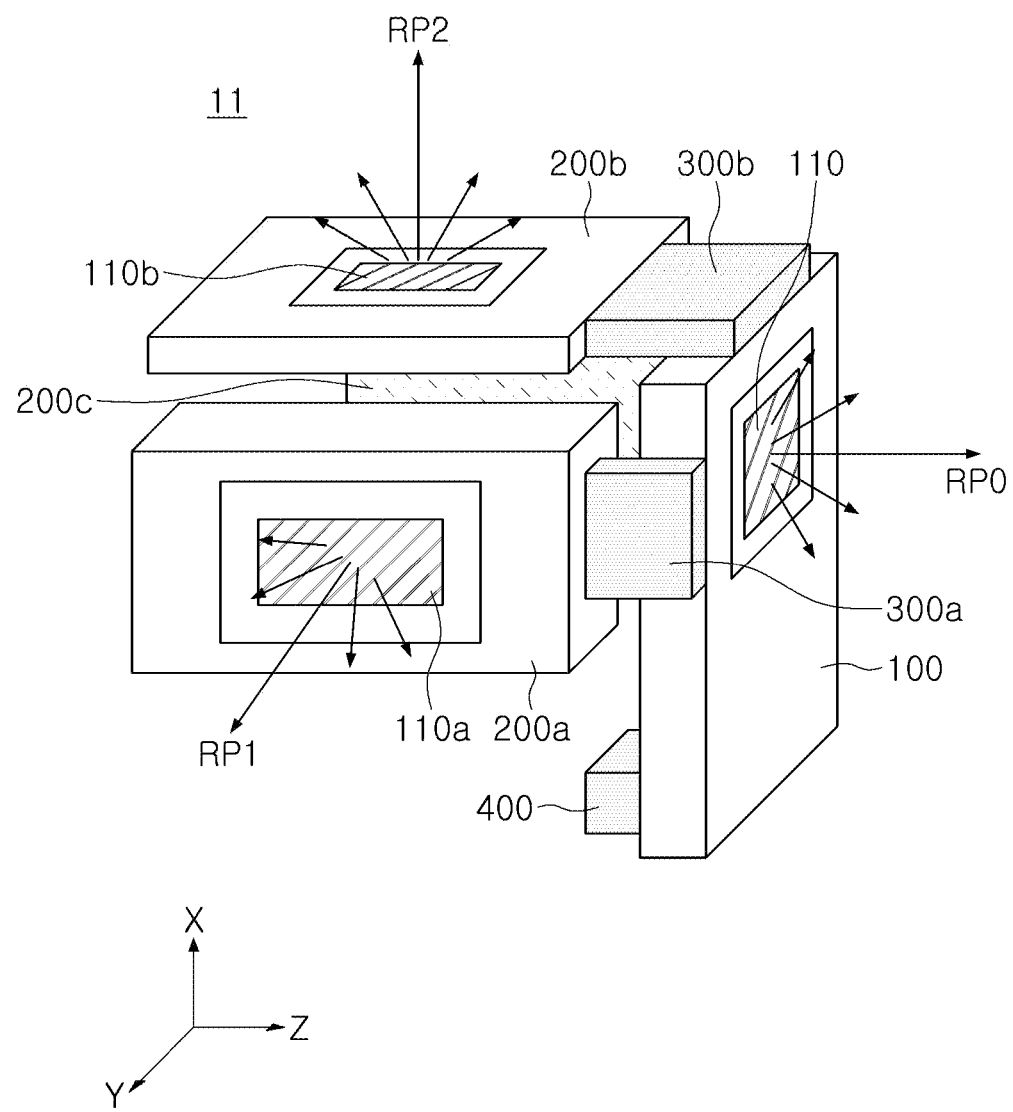

In FIG. 3B, a radio-frequency module 11 according to an embodiment may remotely transmit and receive an RF signal in a first radiation pattern direction RP0 of a first antenna 110. It may remotely transmit and receive an RF signal in a plurality of second radiation patterns RP1 and RP2 of a plurality of second antennas 110a and 110b. Therefore, the radio-frequency module 11 may have broader communications coverage based on various combinations of the plurality of directions.

Figure 3C:
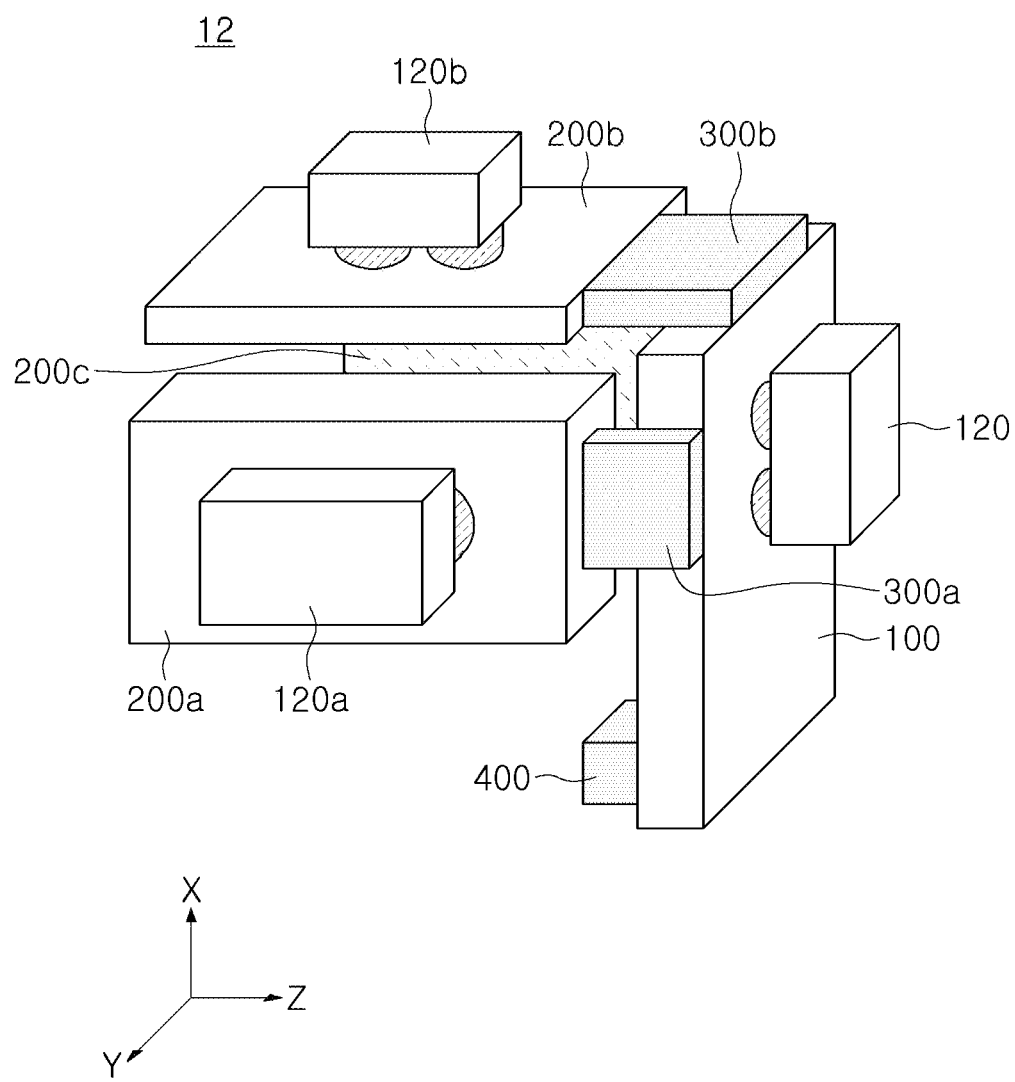

In FIG. 3C, the radio-frequency module 12, according to an embodiment, may include a first substrate 100, a plurality of second substrates 200a, 200b, and 200c, and a plurality of flexible substrates 300a and 300b. Each of the plurality of second substrates 200a, 200b, and 200c may be implemented as an antenna component and may include a plurality of second antennas 120a and 120b mounted on upper surfaces of the plurality of second substrates 200a, 200b, and 200c. The plurality of second antennas 120a and 120b may be mounted by electrical connection members such as solder balls, pins, lands, or pads, but the electrical connection members are not limited thereto.

Figure 3D:
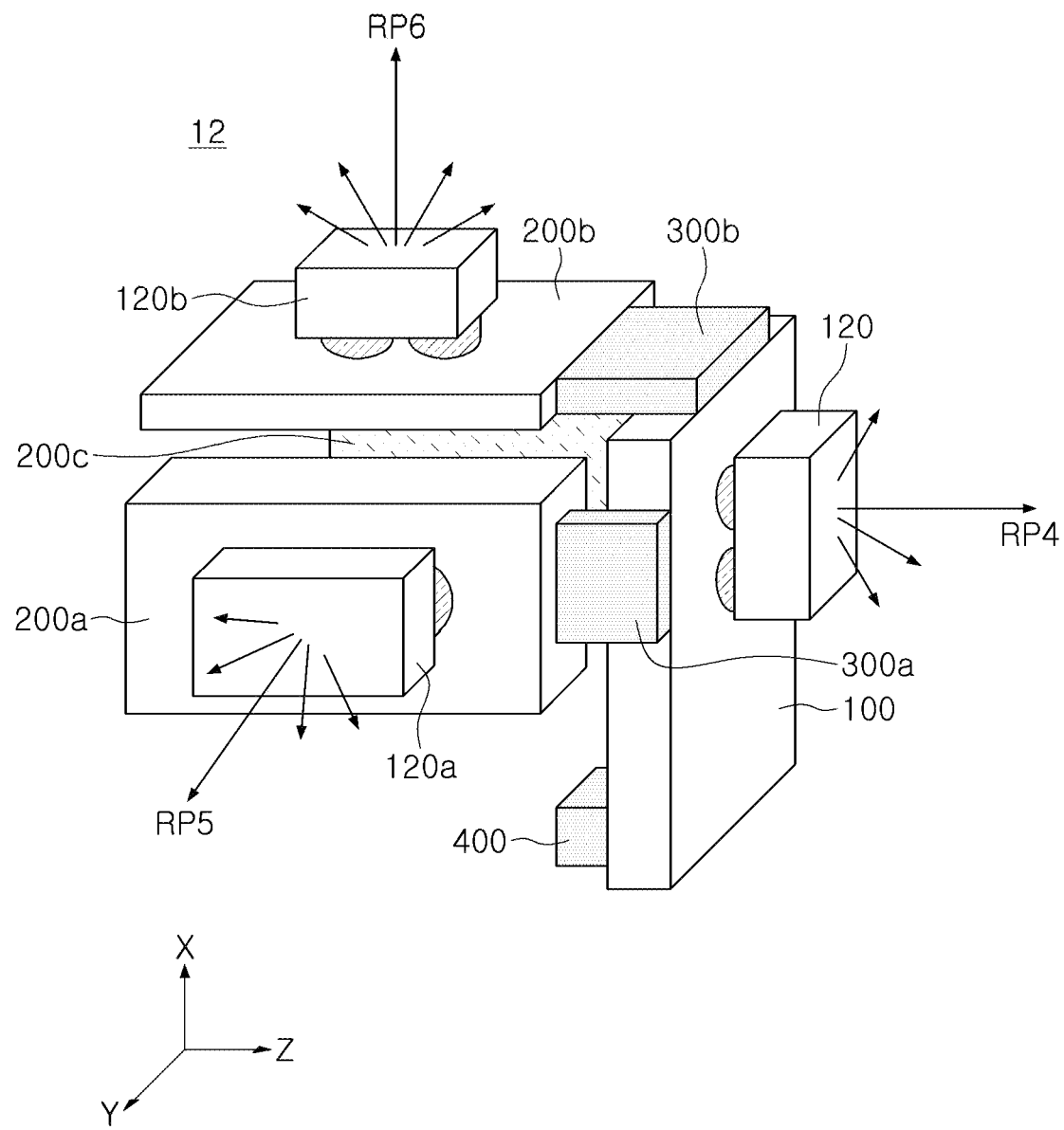

In FIG. 3D, a radio-frequency module 12, according to an embodiment, may remotely transmit and receive an RF signal in a first radiation pattern direction RP4 of a first antenna 110. It may remotely transmit and receive an RF signal in a plurality of second radiation pattern directions RP5 and RP6 of a plurality of second antennas 110a and 110b. Therefore, the radio-frequency module 12 may have wider communications coverage based on various combinations of the plurality of directions.

Figure 3E:
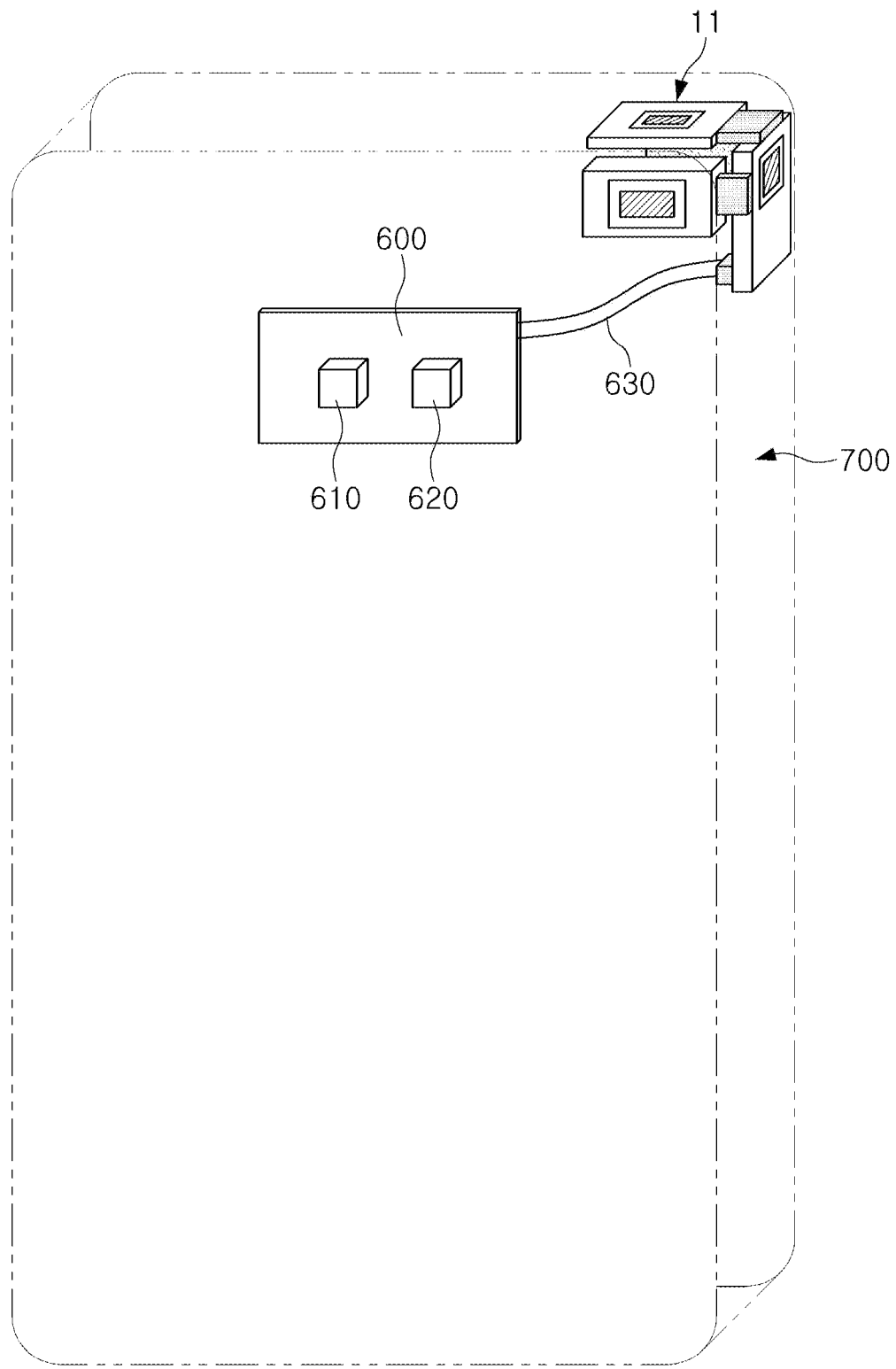
FIG. 3E illustrates an electronic device including a radio-frequency module according to an embodiment of the present disclosure.

FIG. 3E illustrates an electronic device including a radio-frequency module according to an embodiment of the present disclosure.

In FIG. 3E, a radio-frequency module 11, according to an embodiment, may be disposed adjacent to each corner of an electronic device 700. Since a single radio-frequency module 11 may transmit and receive RF signals remotely in a plurality of directions, the electronic device 700 may have wide communications coverage even with only one radio-frequency module 11. In addition, the electronic device 700 may more efficiently avoid a hand of an electronic device user or a display panel or a battery inside of the electronic device to transmit and/or receive an RF signal remotely.

The electronic device 700 may be a smartphone, a personal digital assistant, a digital video camera, a digital still camera, a network system, a computer, a monitor, a tablet PC, a laptop computer, a netbook computer, a television set, a video game console, a smartwatch, an automobile, or the like, but is not limited thereto.

The electronic device 700 may include a base substrate 600, and the base substrate 600 may further include a communications modem 610 and a baseband IC 620.

The communications modem 610 includes one or more of a memory chip such as a volatile memory (for example, a dynamic random-access memory (DRAM)), a nonvolatile memory (for example, a read-only memory (ROM)), or a flash memory; an application processor chip such as a central processor (for example, a central processing unit (CPU)), a graphics processor (for example, a graphics processing unit (GPU)), a digital signal processor, a cryptographic processor, a microprocessor, or a microcontroller; and a logic chip such as an analog-to-digital converter or an application-specific integrated circuit (ASIC) to perform digital signal processing.

The baseband IC 620 may perform analog-to-digital conversion and amplification, filtering, and frequency conversion of an analog signal to generate a base signal. The base signal input/output from the baseband IC 620 may be transmitted to the radio-frequency module 11 through a coaxial cable 630, and the coaxial cable 630 may be electrically connected to a connector of the radio-frequency module 11.

For example, a frequency of the base signal may be a baseband, and may be a frequency (for example, several GHz) corresponding to an intermediate frequency (IF). The frequency of the RF signal (for example, 28 GHz or 39 GHz) may be higher than the IF, and may correspond to millimeter wave (mmWave).

Figure 4A:
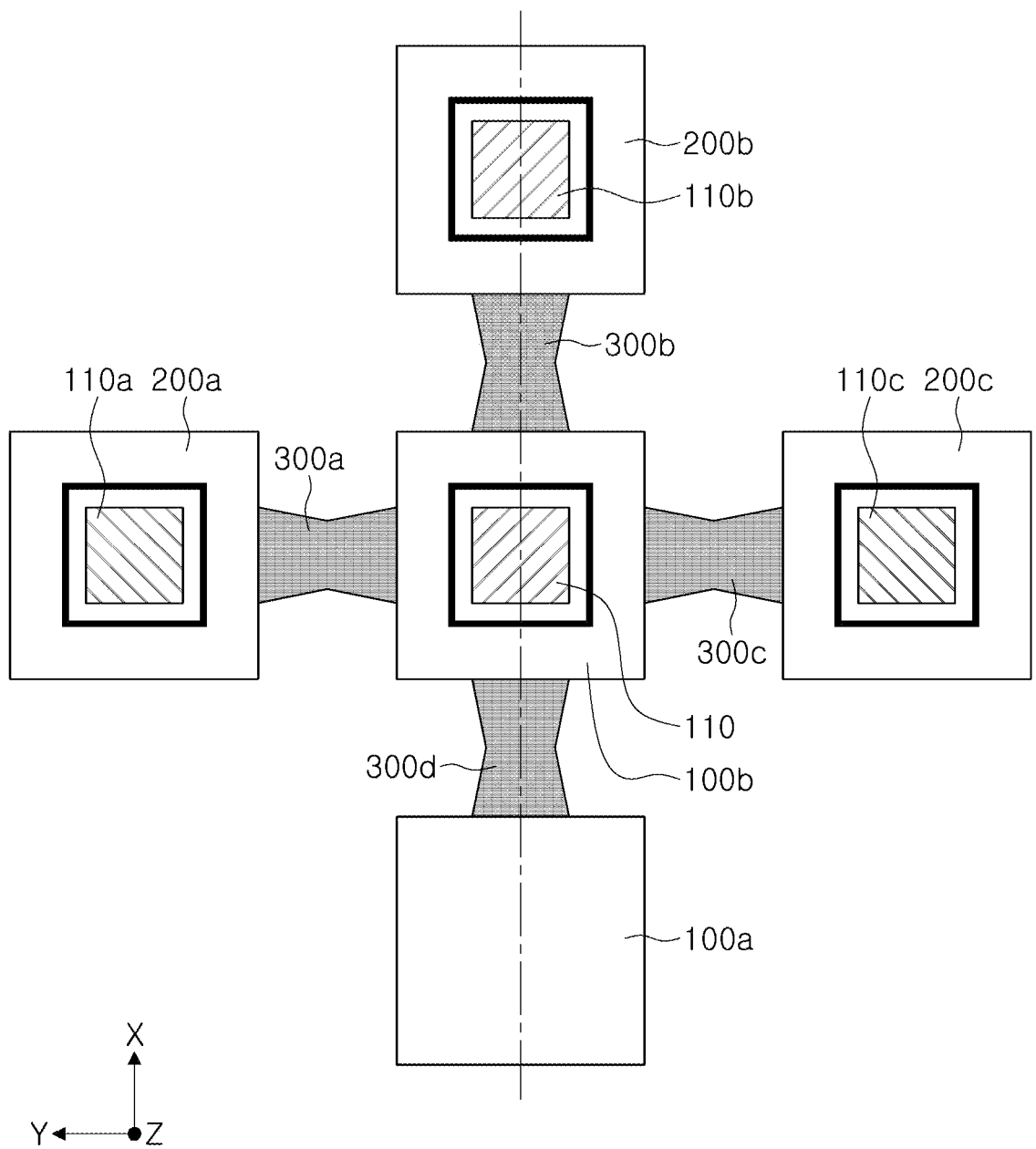
FIG. 4A is a plan view illustrating an upper surface of a radio-frequency module according to an embodiment of the present disclosure.
Figure 4B:
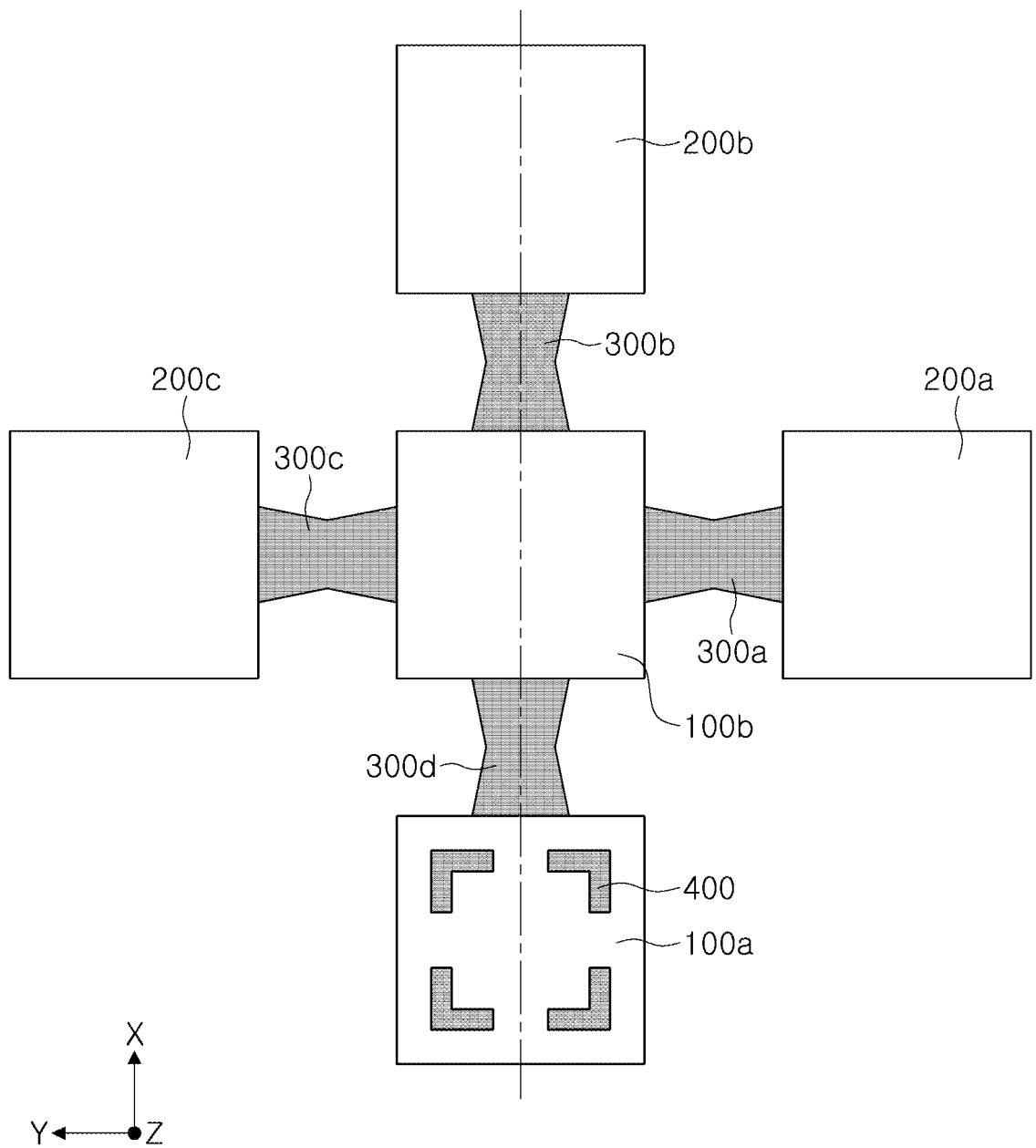
FIG. 4B is a plan view illustrating a lower surface of a radio-frequency module according to an embodiment of the present disclosure.

FIG. 4A is a plan view illustrating an upper surface of a radio-frequency module according to an embodiment of the present disclosure, and FIG. 4B is a plan view illustrating a lower surface of a radio-frequency module according to an embodiment of the present disclosure.

In FIGS. 4A and 4B, a radio-frequency module 13, according to an embodiment, may include a plurality of first substrates 100a and 100b, a plurality of second substrates 200a, 200b, and 200c, and a plurality of flexible substrates 300a, 300b, 300c, and 300d.

The first antenna 110 may be disposed on one substrate among the plurality of first substrates 100a and 100b, and the plurality of second antennas 110a, 110b, 110c may be disposed on the plurality of second substrates 200a, 200b, and 200c, respectively.

Among the plurality of first substrates 100a and 100b, the other substrate may provide an arrangement space of the connector 400.

FIGS. 4C to 4H are plan views illustrating various modified structures of a radio-frequency module according to an embodiment of the present disclosure.

Figure 4C:
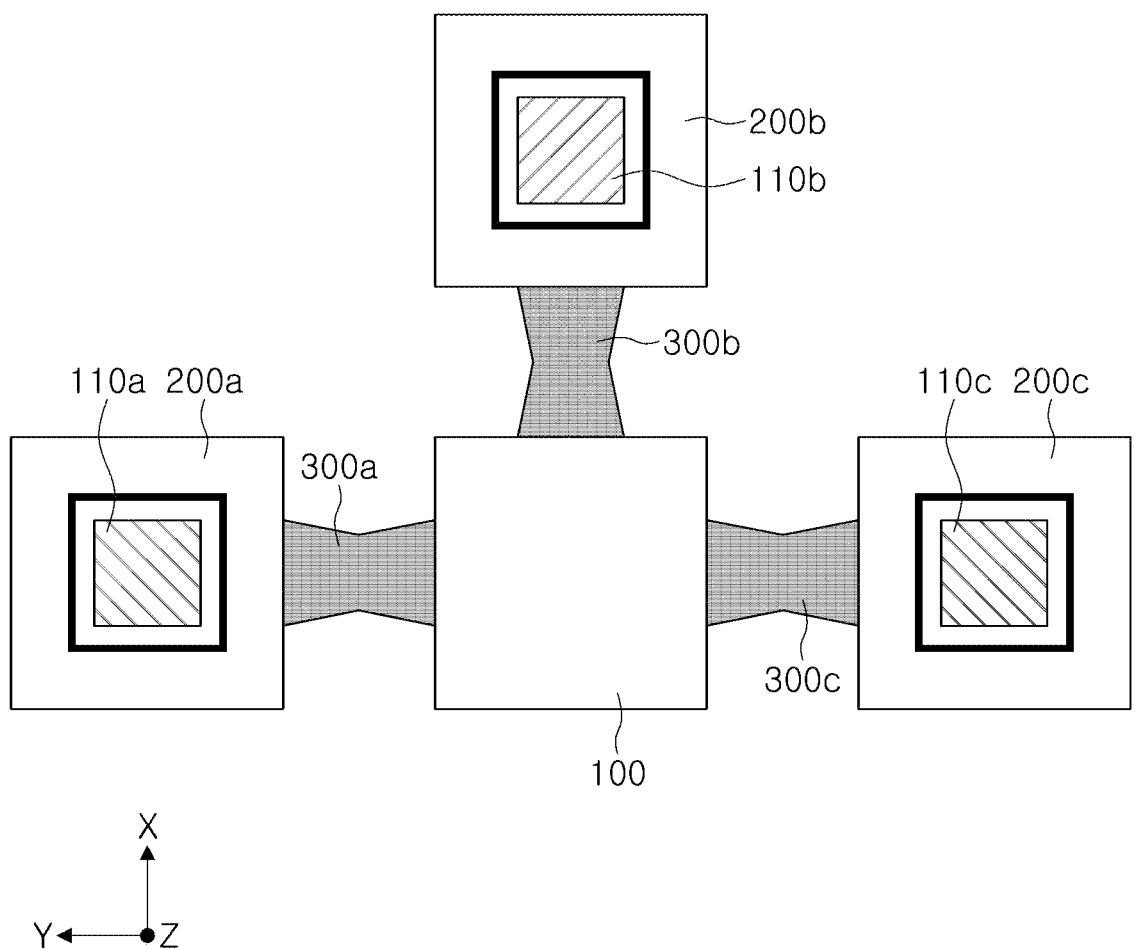
FIGS. 4C to 4H are plan views illustrating various modified structures of a radio-frequency module according to an embodiment of the present disclosure.

In FIG. 4C, a radio-frequency module 14, according to an embodiment, may have a structure in which one of a plurality of first substrates is omitted.

Figure 4D:
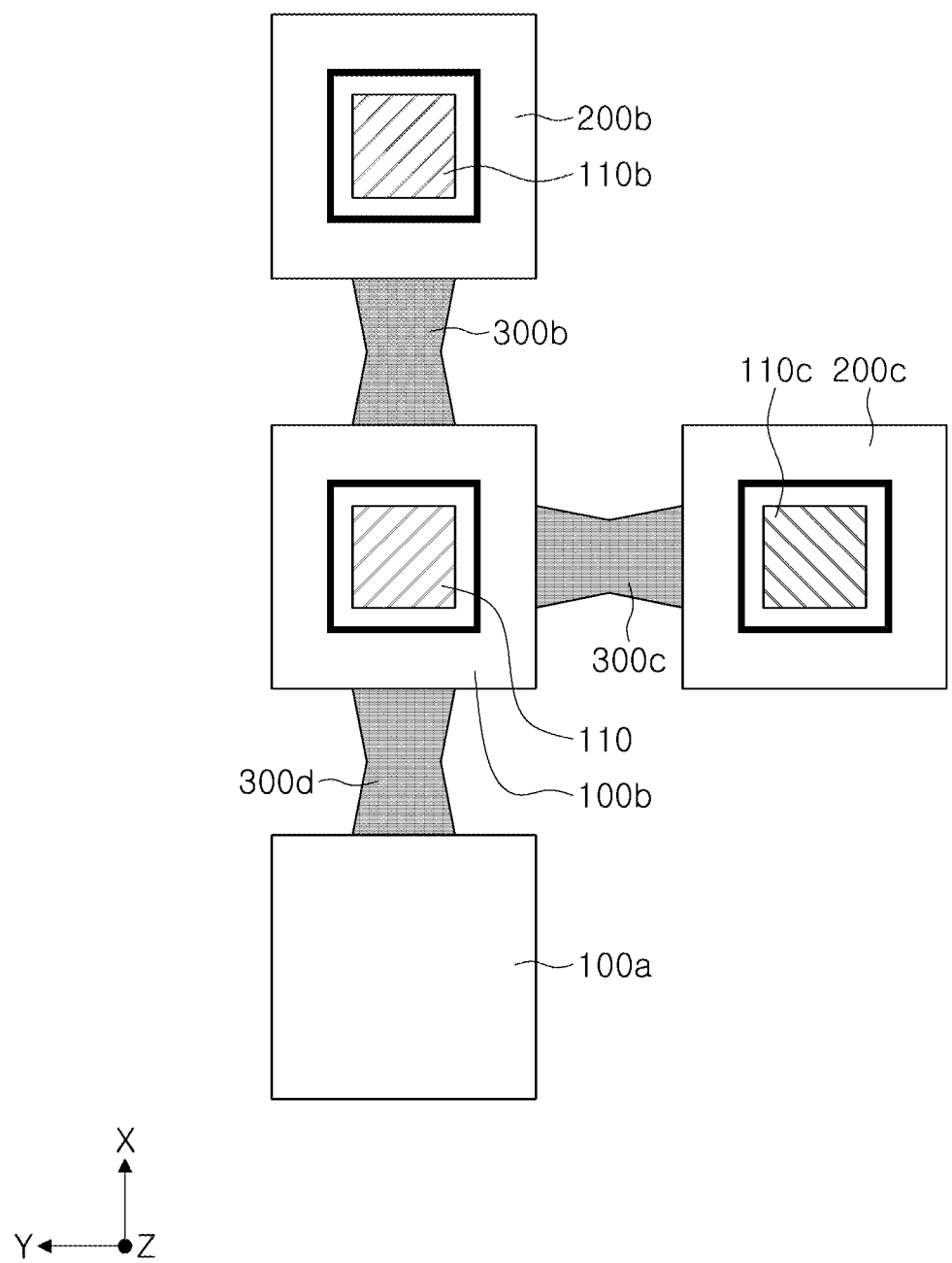

In FIG. 4D, a radio-frequency module 15 according to an embodiment may have a structure in which one of a plurality of second substrates is omitted.

Figure 4E:
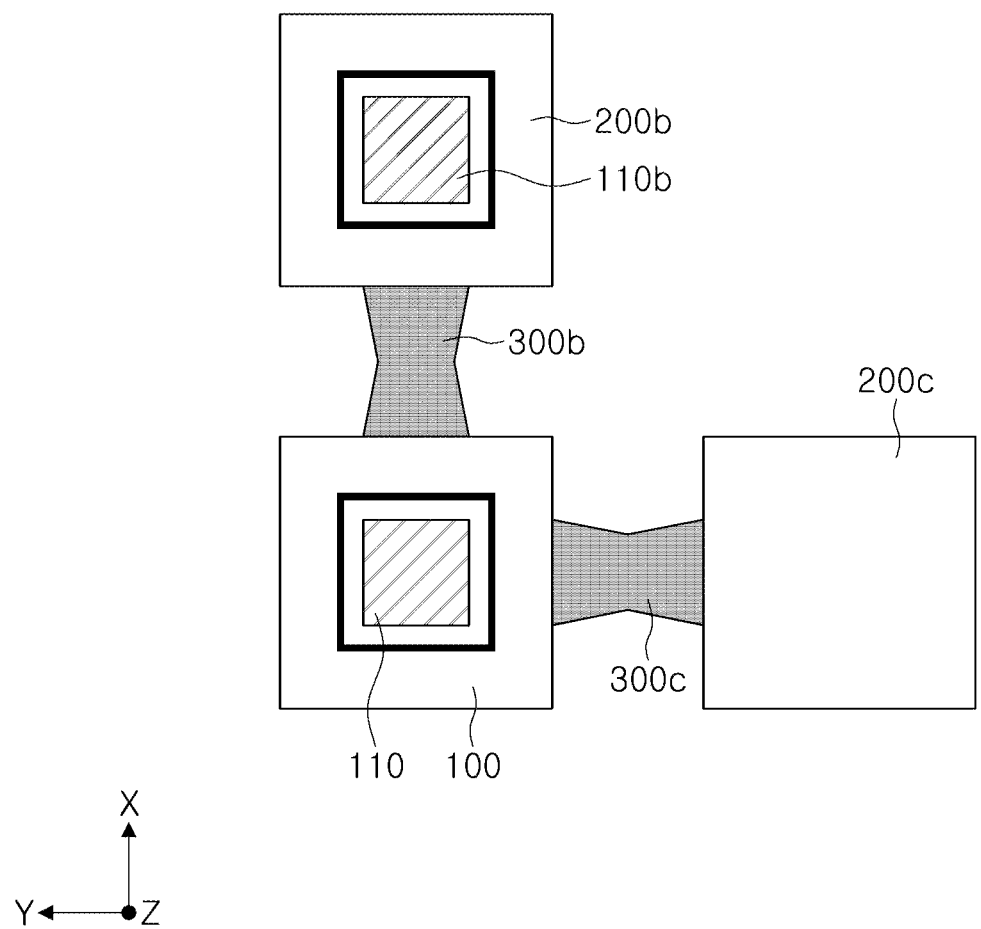

In FIG. 4E, a radio-frequency module 16 according to an embodiment may have a structure in which one of a plurality of first substrates is omitted and one of a plurality of second substrates is omitted.

Figure 4F:
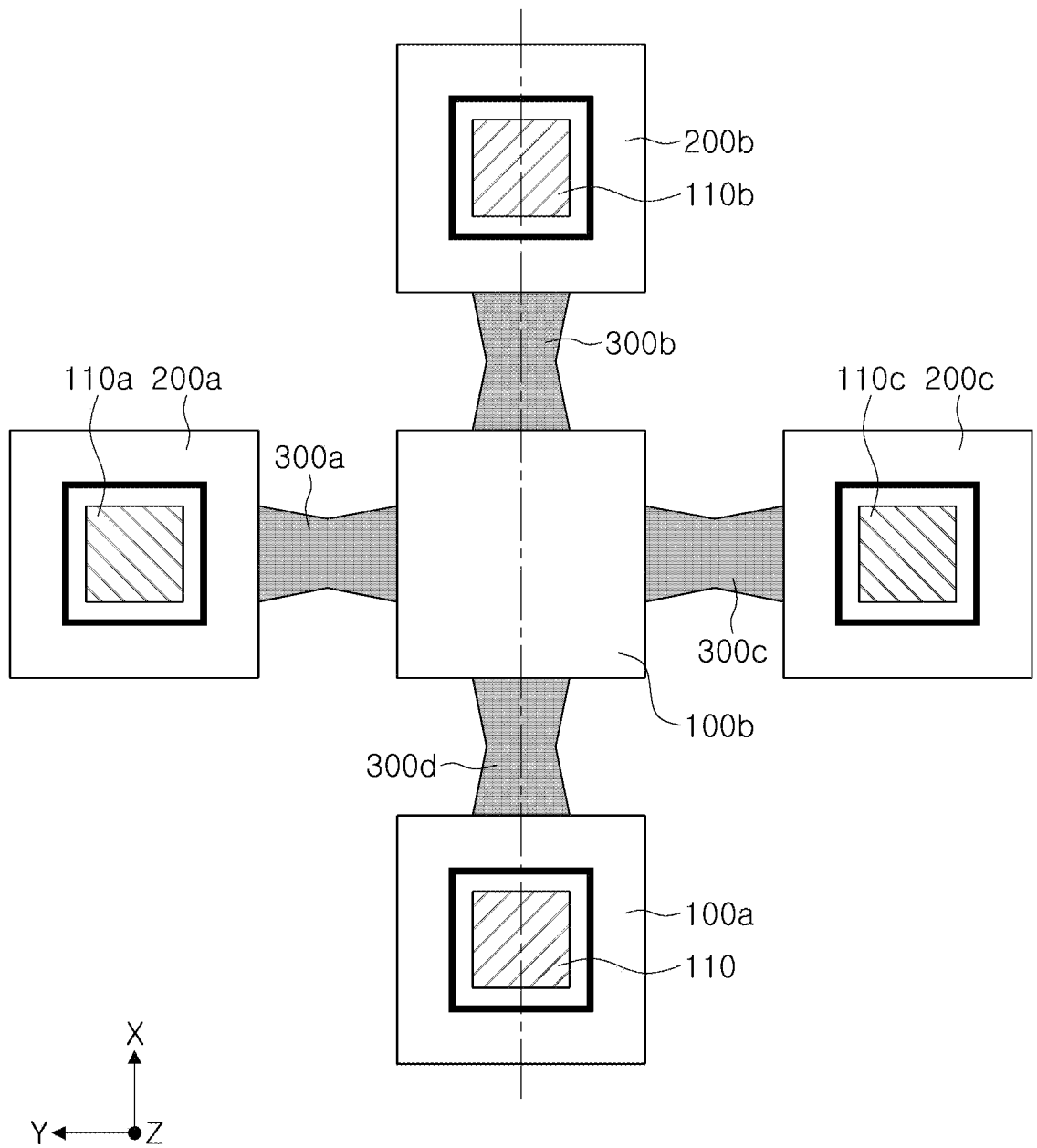

In FIG. 4F, a radio-frequency module 17 according to an embodiment may have a structure in which a first antenna 110 is disposed on the other substrate among the plurality of first substrates 100a and 100b.

Figure 4G:
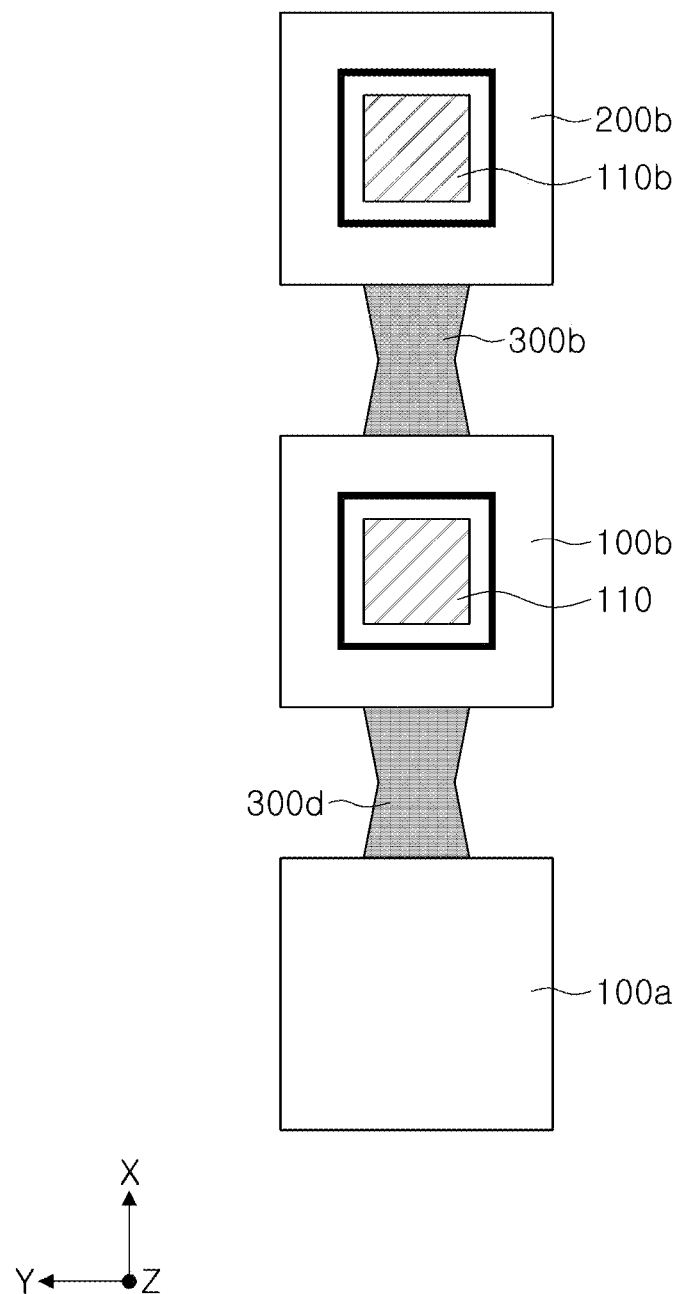
Figure 4H:
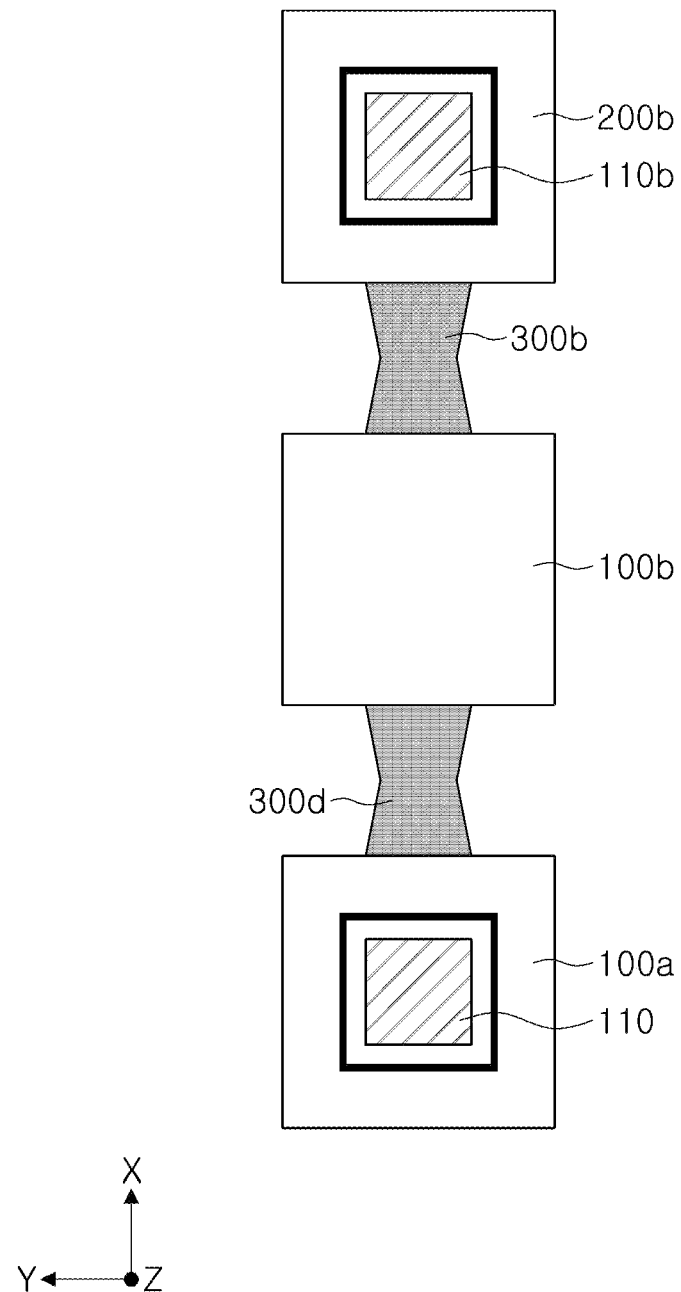

In FIGS. 4G and 4H, radio-frequency modules 18 and 19, according to an embodiment, may include a single second substrate 200b.

FIGS. 5A to 5D illustrate a method of manufacturing a radio-frequency module according to an embodiment of the present disclosure.

Figure 5A:
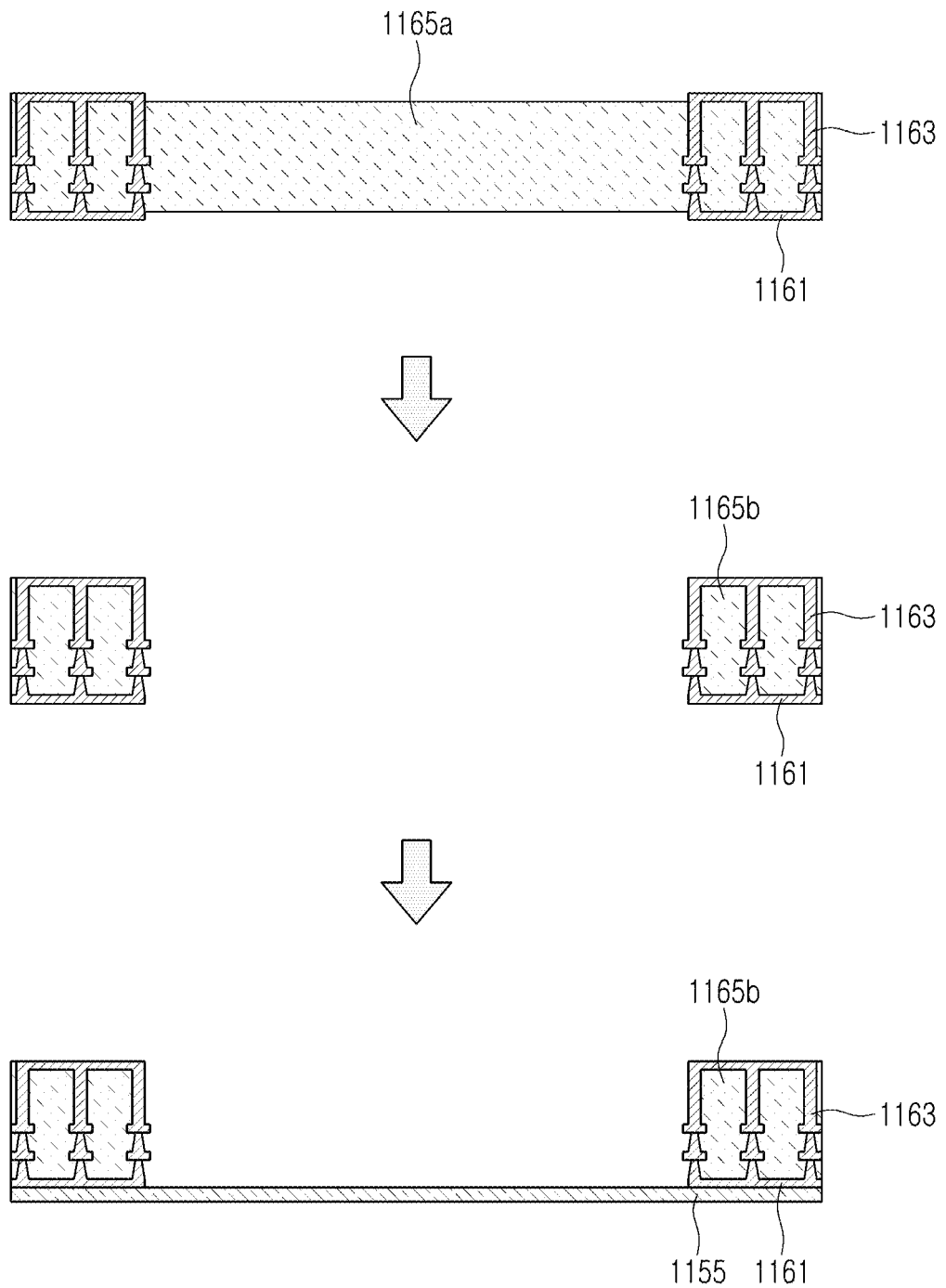
FIGS. 5A to 5D illustrate a method of manufacturing a radio-frequency module according to an embodiment of the present disclosure.

In FIG. 5A, a first core member 1165a may provide an arrangement space of a first core via 1163 and/or a first core wiring 1161, a portion of the first core member 1165a may be removed, and a film 1155 may be disposed on a lower surface of the first core member 1165b.

Figure 5B:
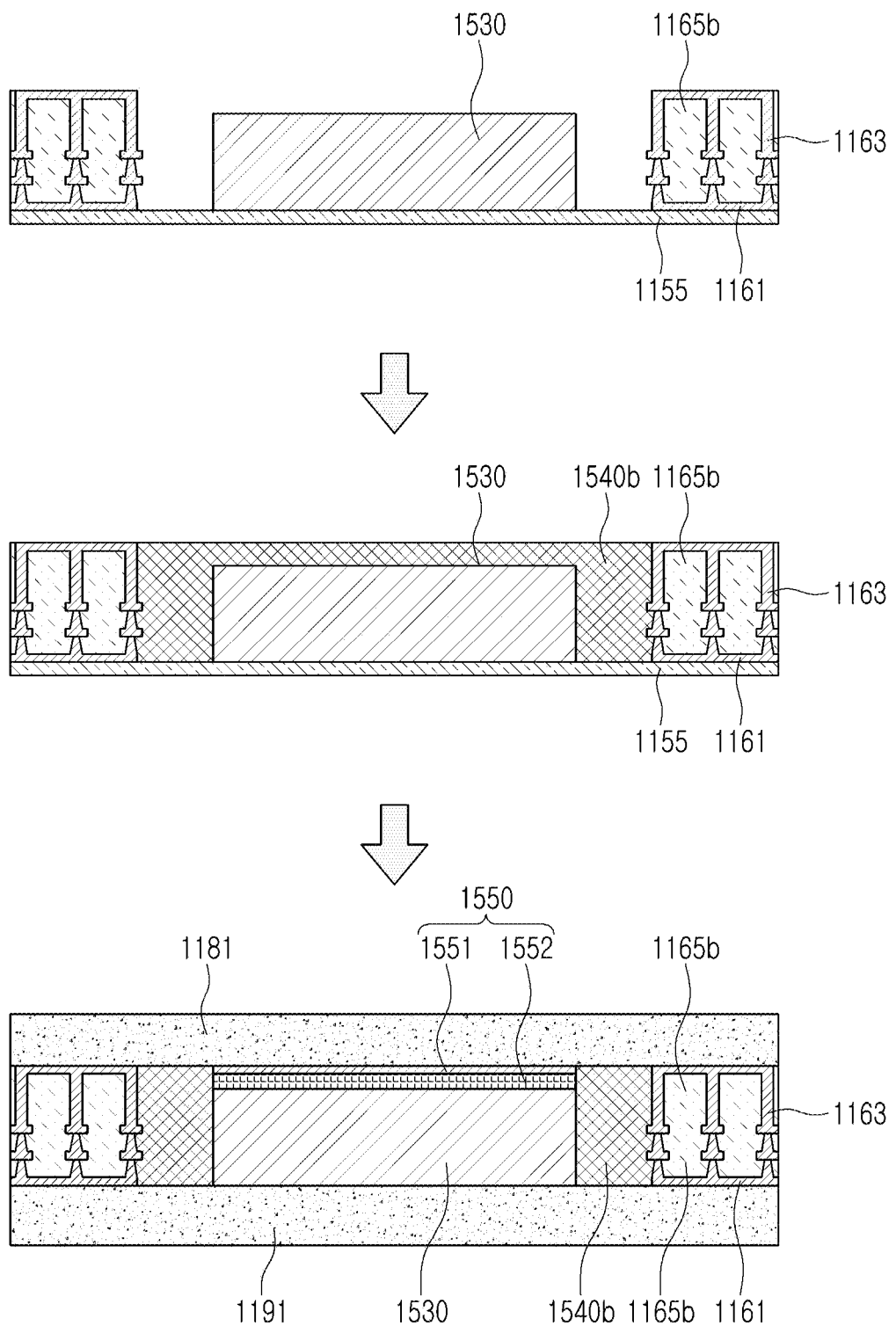

In FIG. 5b, an RFIC 1530 may be disposed on an upper surface of the film 1155, an encapsulant 1540b may fill a portion, in which the RFIC 1530 is not disposed, in a removed portion of the first core member 1165b, and a first upper insulating layer 1181 and a first lower insulating layer 1191 may be disposed on an upper surface and a lower surface of the first core member 1165b, respectively. Depending on the example, a cover metal layer 1551 and an adhesive layer 1552 may be disposed on an upper surface of the RFIC 1530, and a combination structure 1550 of the cover metal layer 1551 and the adhesive layer 1552 may be omitted.

Figure 5C:
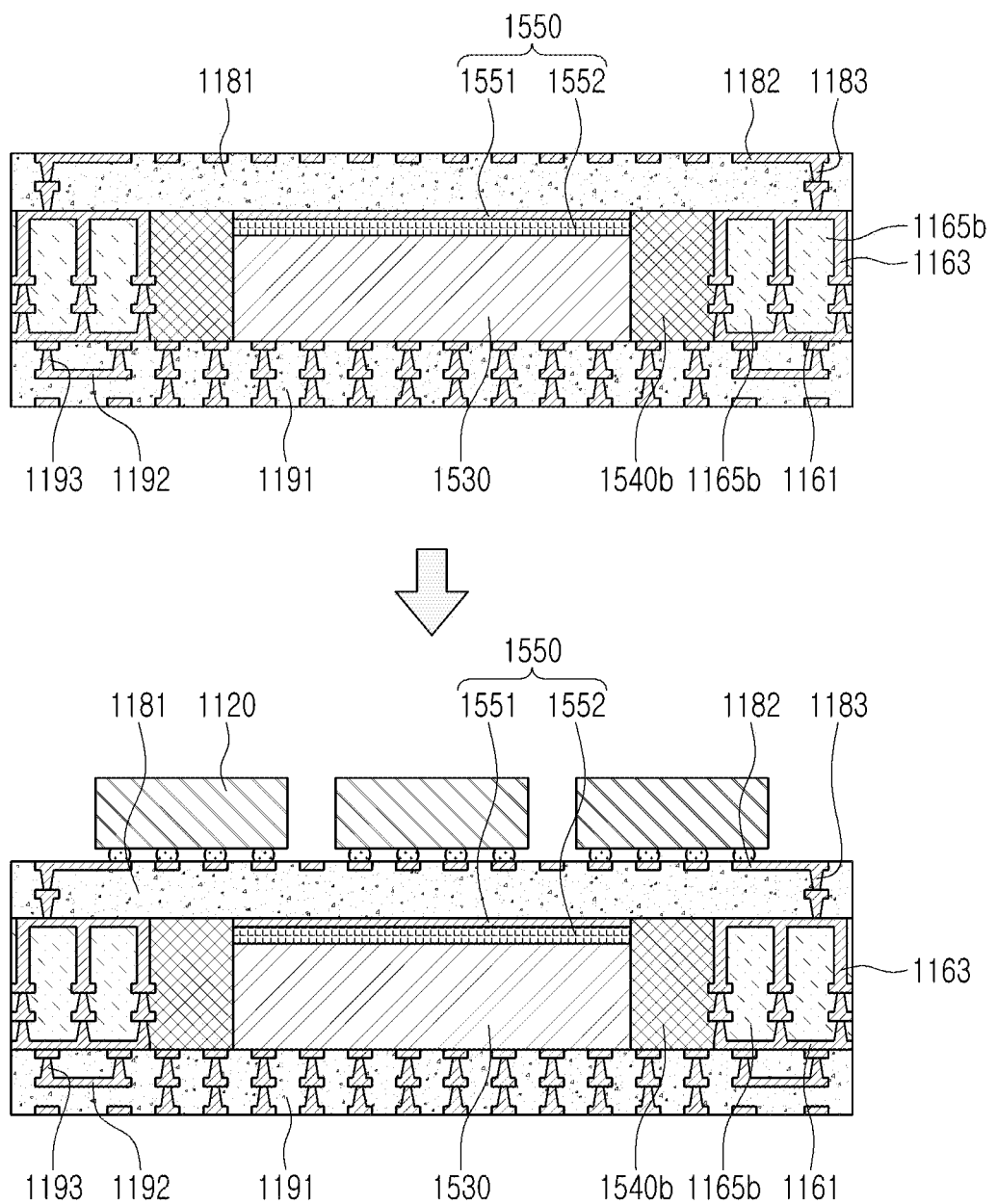

In FIG. 5C, a first upper wiring layer 1182 and a first upper via 1183 may be formed on a first upper insulating layer 1181, and a first lower wiring layer 1192 and a first lower layer 1193 may be formed on the first lower insulating layer 1191, and a first antenna 1120 may be disposed on a first upper insulating layer 1181 and may be electrically connected to the first upper wiring layer 1182.

Accordingly, a first substrate may be completed, and a second substrate may be separately manufactured in a manner similar to a manner of the first substrate.

Figure 5D:
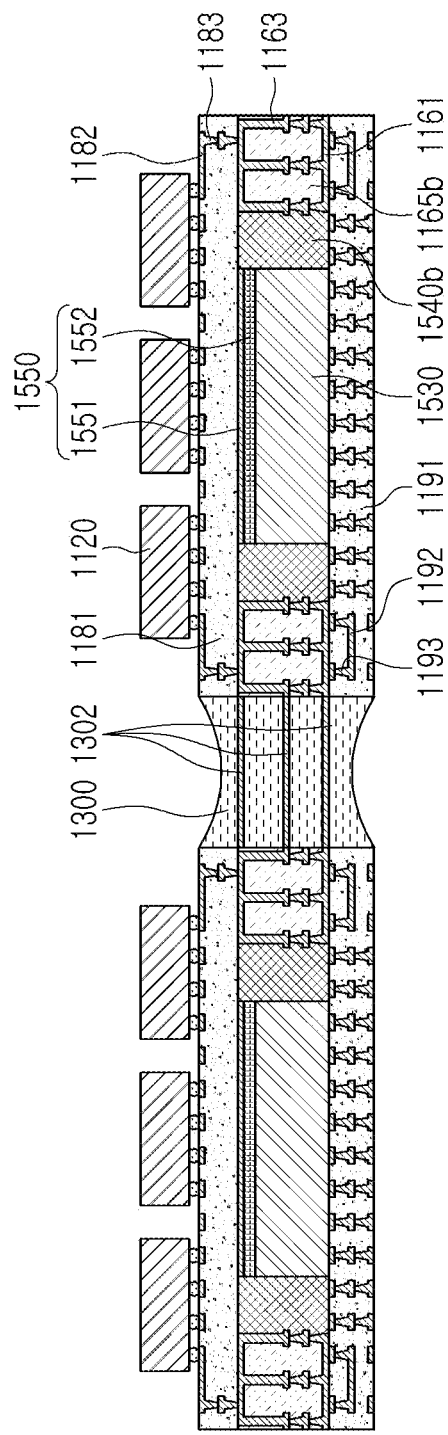

In FIG. 5D, a flexible substrate 1300 may connect the first substrate and the second substrate to each other, and may electrically connect a wiring layer of the first substrate and a wiring layer of the second substrate through an interconnection wiring layer 1302.

The wiring layers and via layers disclosed herein may be formed of a metal material (for example, a conductive material such as copper (Cu), aluminum (Al), silver (Ag), tin (Sn), gold (Au), nickel (Ni), lead (Pb), or titanium (Ti), or alloys thereof), and may be formed by a plating method, such as a chemical vapor deposition (CVD) process, a physical vapor deposition (PVD) process, a sputtering process, a subtractive process, an additive process, a semi-additive process (SAP), or a modified semi-additive process (MSAP), but the present disclosure is not limited thereto.

The insulating layers disclosed herein may be formed of a prepreg, FR4, a thermosetting resin such as an epoxy resin, a thermoplastic resin, or a resin such as a thermosetting resin or a thermoplastic resin impregnated together with an organic filler into a core material such as a glass fiber, a glass cloth, or a glass fabric, Ajinomoto Build-Up Film (ABF), a bismaleimide triazine (BT) resin, a photo imageable dielectric (PID) resin, a copper-clad laminate (CCL), or a ceramic-based insulating material.

The RF signals disclosed herein may have a format according to Wi-Fi (IEEE 802.11 family), Worldwide Interoperability for Microwave Access (WiMAX) (IEEE 802.16 family), IEEE 802.20, Long Term Evolution (LTE), Evolution-Data Optimized (EV-DO), Evolved High Speed Packet Access (HSPA+), High Speed Downlink Packet Access (HSDPA), High Speed Uplink Packet Access (HSUPA), Enhanced Data Rates for GSM Evolution (EDGE), Global System for Mobile Communications (GSM), Global Positioning System (GPS), General Packet Radio Service (GPRS), Code-Division Multiple Access (CDMA), Time-Division Multiple Access (TDMA), Digital Enhanced Cordless Telecommunications (DECT), Bluetooth, 3G, 4G, 5G, and any other wireless and wired protocols, but are not limited thereto. In addition, a frequency of the RF signal (for example, 24 GHz, 28 GHz, 36 GHz, 39 GHz, or 60 GHz) is higher than a frequency of an IF signal (for example, 2 GHz, 5 GHz, 10 GHz, or the like).

As described above, a radio-frequency module according to an embodiment and an electronic device including the same may have improved processing performances for a high-frequency signal (for example, power efficiency, amplification efficiency, frequency conversion efficiency, heat dissipation efficiency, noise robustness, and the like) or may have a reduced effective size.

Since a radio-frequency module according to an embodiment and an electronic device including the same may provide a structure in which an IC and an antenna may be more compressively arranged, performance compared with size may be improved, an increase in size may be suppressed while implementing a plurality of antenna transceiving directions, an RF signal transceiving direction may be easily increased without a substantial sacrifice of antenna performance or size, and an external obstacle (for example, another device inside of the electronic device, a hand of an electronic device user, or the like) may be easily avoided to efficiently remotely transmit and receive an RF signal.

A radio-frequency module according to an embodiment and an electronic device including the same may improve the efficiency of processing (for example, amplifying, frequency-converting, filtering, phase-controlling, and the like) an RF signal transmitted and received from an antenna and may improve power dissipation efficiency and/or heat generation efficiency.

As a non-exhaustive example only, a device as described herein may be a mobile device, such as a cellular phone, a smart phone, a wearable smart device (such as a ring, a watch, a pair of glasses, a bracelet, an ankle bracelet, a belt, a necklace, an earring, a headband, a helmet, or a device embedded in clothing), a portable personal computer (PC) (such as a laptop, a notebook, a subnotebook, a netbook, or an ultra-mobile PC (UMPC), a tablet PC (tablet), a phablet, a personal digital assistant (PDA), a digital camera, a portable game console, an MP3 player, a portable/personal multimedia player (PMP), a handheld e-book, a global positioning system (GPS) navigation device, or a sensor, or a stationary device, such as a desktop PC, a high-definition television (HDTV), a DVD player, a Blu-ray player, a set-top box, or a home appliance, or any other mobile or stationary device configured to perform wireless or network communication. In one example, a wearable device is a device that is designed to be mountable directly on the body of the user, such as a pair of glasses or a bracelet. In another example, a wearable device is any device that is mounted on the body of the user using an attaching device, such as a smart phone or a tablet attached to the arm of a user using an armband, or hung around the neck of the user using a lanyard.

While this disclosure includes specific examples, it will be apparent after an understanding of the disclosure of this application that various changes in forms and details may be made in these examples without departing from the spirit and scope of the claims and their equivalents. The examples described herein are to be considered in a descriptive sense only, and not for purposes of limitation. Descriptions of features or aspects in each example are to be considered as being applicable to similar features or aspects in other examples. Suitable results may be achieved if the described techniques are performed in a different order, and/or if components in a described system, architecture, device, or circuit are combined in a different manner, and/or replaced or supplemented by other components or their equivalents. Therefore, the scope of the disclosure is defined not by the detailed description, but by the claims and their equivalents, and all variations within the scope of the claims and their equivalents are to be construed as being included in the disclosure.

What is claimed is:

1. An antenna module comprising:
   first and second antennas;
   first and second integrated circuits (ICs) electrically connected to the first and second antennas, respectively;
   a first substrate connected between the first antenna and the first IC;
   a second substrate connected between the second antenna and the second IC;
   a flexible substrate electrically connected between the first and second substrates and having a flexibility greater than flexibilities of each of the first and second substrates; and
   a third IC connected to the first substrate, electrically connected to the first IC through the first substrate, and electrically connected to the second IC through the first substrate, the flexible substrate, and the second substrate.

2. The antenna module of claim 1, wherein the first and third ICs are disposed on the first substrate, and
   wherein the second IC is disposed on the second substrate.

3. The antenna module of claim 1, wherein the first and third ICs are horizontally disposed on the first substrate.

4. The antenna module of claim 1, wherein the first antenna includes first antennas arrayed horizontally, and
   the second antenna includes second antennas arrayed horizontally.

5. The antenna module of claim 1, wherein the first IC is a first front-end integrated circuit (FEIC) configured to perform at least an amplification operation of a signal transmitted and/or received by the first antenna, and
the second IC is a second FEIC configured to perform at least an amplification operation of a signal transmitted and/or received by the second antenna.

6. The antenna module of claim 1, wherein the third IC is a radio-frequency integrated circuit (RFIC) configured to perform at least frequency conversion of signals transmitted to the first and second ICs and/or received from the first and second ICs.

7. The antenna module of claim 1, further comprising:
a third antenna; and
a second flexible substrate electrically connected between the first substrate and the third antenna and extended from the first substrate in a third direction.

8. The antenna module of claim 7, wherein the flexible substrate connected to the second substrate is extended from the first substrate in a second direction, and
the first antenna is disposed to radiate a radiation pattern in a first direction on the first substrate.

9. The antenna module of claim 8, wherein the first direction, the second direction, and the third direction are all different from each other.

10. An electronic device comprising the antenna module of claim 1.

11. The electronic device of claim 10, further comprising a baseband IC disposed on a base substrate and connected to one or more of the first, second, and third ICs.

12. An antenna module comprising:
a first substrate;
a first antenna disposed to radiate a radiation pattern in a first direction on the first substrate;
second antennas; and
flexible substrates,
wherein a first flexible substrate of the flexible substrates is electrically connected between the first substrate and a first-second antenna of the second antennas, and a second flexible substrate of the flexible substrates is electrically connected between the first substrate and a second-second antenna of the second antennas, and
wherein the first flexible substrate is extended from the first substrate in a second direction, and the second flexible substrate is extended from the first substrate in third direction.

13. The antenna module of claim 12, wherein the first direction, the second direction, and the third direction are all different from each other.

14. The antenna module of claim 12, further comprising a second substrate electrically connected between one of the second antennas and one of the flexible substrates.

15. The antenna module of claim 12, further comprising:
a first integrated circuit (IC) disposed on the first substrate and electrically connected to the first antenna; and
a third IC disposed on the first substrate and electrically connected to the first IC.

16. The antenna module of claim 15, further comprising a second IC more closely disposed to one of the flexible substrates in comparison with the first substrate, and configured to perform at least an amplification operation of a signal transmitted and/or received by one of the second antennas,
wherein the first IC is configured to perform at least an amplification operation of a signal transmitted and/or received by the first antenna.

17. The antenna module of claim 12, wherein at least one of the flexible substrates includes a liquid crystal polymer (LCP).

18. An electronic device comprising the antenna module of claim 12.

19. The electronic device of claim 18, further comprising a baseband IC disposed on a base substrate and connected to one or more of the first, second, and third ICs.

20. An antenna module comprising:
a first substrate;
a first antenna disposed to radiate a radiation pattern in a first direction on the first substrate;
second antennas;
flexible substrates electrically connected between the first substrate and the second antennas, respectively;
a second substrate electrically connected between one of the second antennas and one of the flexible substrates;
a first integrated circuit (IC) disposed on the first substrate and electrically connected to the first antenna; and
a second IC disposed on the second substrate and electrically connected to the one of the second antennas,
wherein the flexible substrates are respectively extended from the first substrate in at least second and third directions.

21. The antenna module of claim 20, further comprising a third IC connected to the first substrate, electrically connected to the first and second ICs, and configured to perform at least frequency conversion of signals transmitted to the first and second ICs and/or received from the first and second ICs.

* * * * *